US012480302B2

(12) United States Patent
Parkhouse et al.

(10) Patent No.: US 12,480,302 B2
(45) Date of Patent: Nov. 25, 2025

(54) CONNECTION NODE FOR MODULAR BUILDING STRUCTURES

(71) Applicant: Palm Dreamscapes QOZB, LLC, Greenwich, CT (US)

(72) Inventors: Leon Parkhouse, Ventura, CA (US); Andrea Vittadini, Brooklyn, NY (US); Matthew Charles John Clark, Brooklyn, NY (US); Simone Andreatta, Pordenone (IT); Victoire Morgane Chloe Saby, Brooklyn, NY (US)

(73) Assignee: Palm Dreamscapes QO ZB, LLC, Austin, TX (US)

( * ) Notice: Subject to any disclaimer, the term of this patent is extended or adjusted under 35 U.S.C. 154(b) by 110 days.

(21) Appl. No.: 18/517,588

(22) Filed: Nov. 22, 2023

(65) Prior Publication Data

US 2024/0159040 A1 May 16, 2024

Related U.S. Application Data

(63) Continuation-in-part of application No. 17/759,159, filed as application No. PCT/US2021/070116 on Feb.
(Continued)

(30) Foreign Application Priority Data

Nov. 24, 2022 (AU) .............................. 2022275488

(51) Int. Cl.
*E04B 1/24* (2006.01)
*E04B 1/348* (2006.01)
(Continued)

(52) U.S. Cl.
CPC .......... *E04B 1/2403* (2013.01); *E04B 1/3483* (2013.01); *E04B 1/388* (2023.08);
(Continued)

(58) Field of Classification Search
CPC ................ E04B 1/2403; E04B 1/3483; E04B 2001/2406; E04B 2001/2415; E04B 2001/2451; F16B 7/185
(Continued)

(56) References Cited

U.S. PATENT DOCUMENTS 3,563,581 A * 2/1971 Sommerstein ........ F16B 7/0486
403/217
4,082,470 A * 4/1978 Alberts .............. A47B 47/0016
403/295
(Continued)

FOREIGN PATENT DOCUMENTS

JP 2001107467 4/2001
JP 2001254445 9/2001

OTHER PUBLICATIONS

Extended Search Report, European Patent Office, corresponding Application No. 21750534.6, Feb. 13, 2024.

*Primary Examiner* — Paola Agudelo
(74) *Attorney, Agent, or Firm* — GOTTLIEB RACKMAN & REISMAN PC

(57) ABSTRACT

A connection node assembly for use in connecting an upper prefabricated building module to a lower module. Hollow vertical edge supports of the building modules have top and bottom connection parts. A connecting bolt can be passed through the top part of an upper vertical support in the upper building module and seated within the bottom part of that vertical support with the shank extending downward. The shank engages a threaded aperture in a connecting nut secured within the top part of a corresponding lower vertical support in the lower building module. Diaphragm plates sandwiched between the upper and lower vertical supports are used to tie horizontally placed modules together.

17 Claims, 21 Drawing Sheets

Related U.S. Application Data 3, 2021, now Pat. No. 12,129,645, which is a continuation of application No. 16/987,641, filed on Aug. 7, 2020, now Pat. No. 10,907,342.

(60) Provisional application No. 62/971,669, filed on Feb. 7, 2020.

(51) Int. Cl.
  *E04B 1/38* (2006.01)
  *F16B 7/18* (2006.01)
  *F16B 12/30* (2006.01)

(52) U.S. Cl.
  CPC .............. *F16B 7/182* (2013.01); *F16B 12/30* (2013.01); *E04B 2001/2406* (2013.01); *E04B 2001/2415* (2013.01); *E04B 2001/2418* (2013.01); *E04B 2001/2451* (2013.01); *E04B 2001/246* (2013.01); *E04B 2001/2466* (2013.01)

(58) Field of Classification Search
  USPC .......................................................... 52/79.1
  See application file for complete search history.

(56) References Cited

U.S. PATENT DOCUMENTS

| | | | | |
|---|---|---|---|---|
| 4,271,654 | A * | 6/1981 | Jungbluth | E04B 1/1912 |
| | | | | 52/655.1 |
| 4,758,111 | A * | 7/1988 | Vitta | E04B 1/34315 |
| | | | | 52/646 |
| 4,780,018 | A * | 10/1988 | Godden | E04B 1/1906 |
| | | | | 403/292 |
| 5,860,258 | A | 1/1999 | Faith et al. | |
| 6,390,719 | B1 * | 5/2002 | Chan | E04B 1/5806 |
| | | | | 52/646 |
| 7,748,160 | B1 * | 7/2010 | Jordan, Jr. | A01M 1/245 |
| | | | | 43/132.1 |
| 9,458,619 | B2 | 10/2016 | Bowron et al. | |
| 10,450,737 | B2 | 10/2019 | Bowron | |
| 2016/0017595 | A1 | 1/2016 | Lee | |
| 2017/0002559 | A1 | 1/2017 | Bowron et al. | |
| 2017/0191515 | A1 * | 7/2017 | Kwon | E04B 1/3483 |
| 2018/0135295 | A1 | 5/2018 | Bowron | |
| 2018/0148919 | A1 * | 5/2018 | Rebollar Buldain | E04B 1/348 |
| 2019/0078321 | A1 * | 3/2019 | Bowron | E04H 1/005 |
| 2019/0153720 | A1 | 5/2019 | Bonlin | |
| 2020/0056368 | A1 | 2/2020 | Adachi | |
| 2023/0125829 | A1 * | 4/2023 | Parkhouse | E04B 1/3483 |
| | | | | 52/79.13 |

* cited by examiner

CONNECTION NODE FOR MODULAR BUILDING STRUCTURES

CROSS-REFERENCE TO RELATED APPLICATIONS

This application is a continuation-in-part of pending U.S. application Ser. No. 17/759,157, filed Jul. 20, 2022, which is a US National Phase of PCT/US2021/0701166, filed Feb. 3, 2021 and which claims priority to U.S. Provisional application No. 62/971,996, filed Feb. 7, 2020 and U.S. application Ser. No. 16/987,641, filed Aug. 7, 2020 and issued as U.S. Pat. No. 10,907,342, and which also claims priority to U.S. Provisional application No. 62/971,996, filed Feb. 7, 2020.

The application further claims priority to Australian Application No. 2022275488, filed Nov. 24, 2022.

FIELD OF THE INVENTION

The present invention relates to a connection node assembly for use in connecting prefabricated building modules together and to a module support component having connection node assembly components formed therein.

BACKGROUND

Many high-rise buildings are constructed using pre-fabricated modules that are stacked and joined together on-site. Each module is a generally box shaped unit with a primary chassis comprising vertical support posts and horizontal cross members joined together at corner nodes. Typically, the vertical supports in a module are hollow support structure (HSS), such as steel profiles with a square or rectangular cross-section. A prefabricated module may also be at least partially finished with internal walls, flooring, and hookups for electricity and water.

During construction, an initial tier of modules is installed horizontally and affixed to a building foundation or previously installed substructure. Adjacent top corners of the modules are connected together with a joining plate. A second tier of modules is positioned over the first tier, aligned and positioned in place. The bottom corners of the second tier modules are then affixed to the top corners of the first tier modules.

An advantage of using prefabricated modules is that they can be assembled inside and remotely from the construction site, reducing the amount of outdoor work that must be done at the construction site itself. Notwithstanding, job-site construction often continues in a wide variety of weather conditions. To prevent water from getting into the module assembly and damaging pre-installed components, the module, as supplied, can have an outer weatherproofing layer. Care must be taken during construction to avoid damaging the weatherproofing layer.

Typically, volumetric modular buildings rely on a separate structure to provide lateral stability against horizontal loads (such as a concrete core or an external steel brace-frame). Each module is only responsible for carrying vertical loads to the tiers below through its vertical columns.

Standard methods and systems for connecting prefab building modules during erection are designed to ensure vertical continuity between stacked columns and horizontal continuity between modules of the same level. Continuity is typically achieved by means of large joining plates to connect the corners of adjacent modules. These plates extend well past the vertical support members and are affixed to structures on the horizontal support beams where the connection points are accessible by the installers.

Such use of large joining plates that extend past the vertical support members may require the weatherproofing layer to be peeled back around the corners of the module in order to expose the horizontal support beams to which the plate is connected. However, doing this also exposes a relatively large area of the module itself around the corner and can damage the weatherproofing layer. As a result, there is an increased chance of water gaining entry to the interior of the module during construction and causing damage to interior components.

Further, conventional joining systems often require construction personnel to be positioned at the base of the module when connecting it to a module below. Limited visual and physical access to the corner connections from this position can make proper alignment difficult to achieve. Due to factors such as this, deficiencies in installation control, as well as fabrication tolerances, the installation tolerance in volumetric modular construction is normally in the 0.25 inch to one inch range and modules often need to be manually jacked into their proper alignment after they have been installed. Such misalignments exceed by far the installation tolerances for standard building facade systems which are applied to the outer walls of the building. As a result, much if not all of the facade installation operations need to be done site and this can introduce conspicuous delays to the stacking schedule.

There is a need for an improved method and system for connecting building modules during construction that provides greater accuracy and superior load distribution characteristics along the vertical supports while providing a simplified and safer installation process that can be employed without having to disturb weatherproofing on the module.

SUMMARY

These and other needs are met by a connection node system for use in joining hollow vertical supports of building modules configured so that vertical supports can be connected vertically to each other by a bolt that is passed inside the interior of an upper support and through the bottom of the upper vertical support to connect to the top of the vertical support on the lower vertical support.

In an embodiment, the connection node system is largely integrated within the vertical supports that are used in chassis of a modular building unit. Each respective vertical support has a hollow elongated body that extends along a central axis. A first connection portion is formed at the bottom of each support and will be the top portion of the connection node system when that support is mounted on top of a lower support. The first connection portion has an axial bore through it opening into the interior of the support. The axial bore is configured so that a connecting bolt can be passed down through the interior of the support and seat on a shoulder within the bore with the bolt's shank extending out from the support.

A second connection portion is formed on the top of each support and will be the bottom portion of the connection node system when that support is mounted beneath an upper support. The second connection portion comprises an axial hole extending to the interior of the support. The axial hole has a diameter throughout greater than the head diameter of the connecting bolts to permit a bolt and associated drive socket to be fed through the second connection portion and through the support's interior allowing the bolt to engage the bore in the first connection portion. The axial hole should also be large enough to allow a tool for tightening the bolt to be passed through. The axial hole has an internally facing shoulder and is configured so a coupler nut in an insertion position can be placed into the axial hole along the axis and then rotated axially to a captured position where the shoulder blocks axial motion of the coupler towards the second end. The coupler nut has a threaded aperture to receive the shank of the bolt extending out from the first connection portion of an upper support.

The supports can be steel hollow support structures that can have a rectangular (including square) or other cross-sectional shape. The coupling nut can have the same cross-section shape as the support or a different shape. The axial hole has a first open area adjacent to the end of the support. The first open area can have the same cross-section shape as the coupling nut and is large enough to allow the nut to pass through. A second open area is axially inward and adjacent to the first open area. The second open area can have a circular cross-section with a diameter substantially the same as the maximum diameter of the first open area. The larger second open area defines inward facing shoulders adjacent to the first open area which prevents the coupler nut from being removed when rotated to a captured position. A third open area formed inward from the second area nut keeps the coupler nut from passing inward beyond the second area. The first open area can have the same shape or different shape as the support cross-section, such as square, and can be rotated thereto so that sides defining the first open area are not parallel to the sides of the support.

One or more locking holes can be provided in the end surface of the second connecting part and that extend through to the second open area. The locking holes are positioned so that when a locking pin is inserted into the locking hole, the locking pin restricts rotation of a coupler in the captured position within the second open area.

A diaphragm plate can be provided to connect the tops of horizontally adjacent vertical supports. The diaphragm plate has a plurality of bolt apertures that are positioned to align with the threaded apertures in coupler nuts mounted in the second connection portions of the adjacent supports. The diaphragm plate can also have vertically extending alignment members (such as circular or diamond profile pins or cones) that mate with corresponding alignment features in the first connecting portion of a vertical support being lowered therein. In a further embodiment, the coupler nut can be integrated with the diaphragm plate.

Alignment holes can also be formed in the diaphragm plate and the second connecting portion and/or the coupler nut. The alignment holes are positioned so that when the coupler is in the captured position in the second connection part, the diaphragm plate can be positioned over the second connection part with the diaphragm alignment hole and coupler alignment hole axially aligned and the bolt aperture axially aligned with the axial hole in the second connector part. Locking bolts placed through the diaphragm alignment holes and into the coupler alignment holes can be used to temporarily hold the diaphragm plate in alignment over one vertical support while the vertical support from an upper module is lowered over another portion of the diaphragm. A bolt can also be temporarily inserted through the diaphragm plate into the coupler nut. Once the diaphragm is clamped in place under that other vertical support, the locking bolts and diaphragm plate bolt can be removed.

A lifting plate with the same basic shape as the coupler nut can also be provided. Instead of a threaded aperture, the lifting plate has a lifting eye. The lifting plate can be mounted in the second portion of the vertical supports (e.g., at the top) in the same manner as a coupler nut and the lifting eye used as a cable connection point for hoisting the module into place. When the module is correctly placed, the lifting plate can be removed.

Advantageously, the internal bolting configuration allows building modules to be connected without having to disturb existing weatherproofing. The diaphragm plate can also be reduced in size so that it only covers the tops of the adjacent vertical supports, reducing weight and material cost. The connection node system, as disclosed, allows a node of eight module corners (where four upper and four lower modules come together) to be securely joined together using only four bolts and an appropriately configured diaphragm plate. Because a connecting bolt is inserted through the top of the vertical support on an upper module and tightened using an elongated wrench assembly operated from above the upper, module workers need to spend less time working at the bottom of a module thereby increasing worker safety.

The bolted connection can resist tension as required by various building codes, even if the connection remains in compression during its use in all load cases. The bolt can be pre-tensioned during construction during the stacking procedure. This bolted connection turns individual module columns into continuous steel columns from the bottom to the top of the building. When rectangular modules are stacked, neighboring corner columns sit side by side in configurations of two (at the façade) or four (internally). At the corners and irregular shaped areas of a building there may also be configurations of one (i.e. a single column) or three. Differently shaped modules, such as hexagons, would have more possible configurations. The diaphragm plate placed on top of columns connects side by side neighboring columns together during stacking. The column bolts from the modules above pass through holes in the diaphragm plate and the diaphragm plate operates to create a tying load path laterally between all columns in the group.

The chassis components can be assembled at the offsite module assembly facility by bolting the components together. This allows for efficient transport to the module assembly facility by transporting the pre-assembled frames and beams in a flat pack configuration rather than a volumetric configuration. This enables the industry best practice of not "shipping air".

The simple bolted construction at the offsite assembly facility eliminates any need for welded joints, thus reducing the time to assemble and inspect the components, and reducing the labor content overall. The lack of welding at the assembly facility and the construction site reduces the level of skill required to erect the building and lowers the overall cost of labor and inspection.

The bolted connections provide for significantly tighter control of build tolerances, allowing for stacking with a curtain wall façade pre-installed on the modules. Components can be machined for tight tolerance assembly and then assembled and inspected to tighter tolerances without incurring significant cost.

The use of standardized components allows for efficiencies of scale in their production, such as development of tooling for the rapid setup of CNC machinery to perform the final machining of a cross beam, including the location of the bolt holes.

DESCRIPTION OF THE DRAWINGS

Further features and advantages of the invention, as well as structure and operation of various aspects of the methods and systems of the invention the implementations are disclosed in detail below with references to the accompanying drawings, in which.

DETAILED DESCRIPTION

Figure 1A:
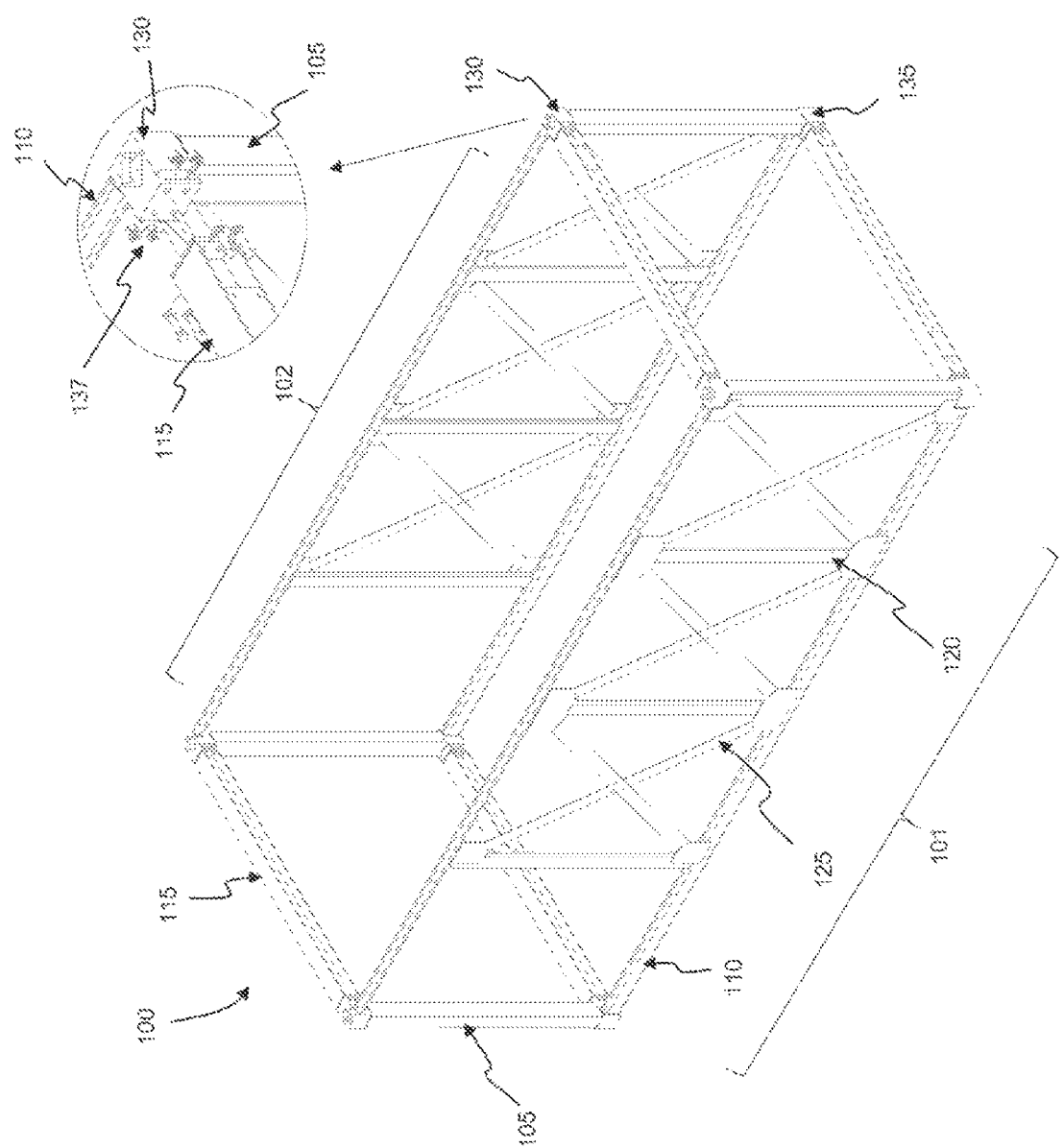
FIG. 1A is an illustration of a representative chassis that can form the support structure of a prefabricated building module.

FIG. 1A is an illustration of a representative chassis 100 that can form the support structure of a prefabricated building module. The chassis comprises rectangular front and rear portions 101, 102, each having a pair of vertical supports 105 and top and bottom horizontal supports 110. The front and rear portions 101, 102 are connected to each other with horizontal beams 115. The chassis can also have various other structural elements, such as posts or wall studs 120 and cross supports 125. Vertical supports 105 are hollow support structures (HSS) and can have a rectangular (including square), or other shape cross-section. A square cross-section is illustrated.

The various vertical supports 105, horizontal supports 110 and horizontal beams 115 are joined at each corner with a top connecting part 130 (for top chassis corners) or bottom connecting part 135 (for the bottom chassis corners). The connections of the horizontal supports and beams 110,115 to the connecting part 130, 135 can be made using conventional techniques. In the illustrated embodiment, the vertical supports 105 and horizontal supports 110 are connected to a respective top and bottom corner connecting parts 130, 135 using welds and the horizontal beams 115 are bolted in place at a joining assembly 137 such as a butt joint, shown in more detail in FIG. 1C. Other connection means could be used. Instead of a butt joint, a flange can extend from a corner connecting part 130 and be connected to a horizontal beam 115 in a bolted-together lap joint, shown in more detail in FIG. 1D.

In one configuration, the top and bottom connecting parts 130 are made of steel that is milled or cast into the proper configuration. The vertical supports are also steel. Vertical supports 105 can be provided, e.g., to a facility where the chassis are to be prefabricated, with the top and bottom connecting parts 130 already attached and the top and bottom ends of the assembly milled to create a flat bearing connection surface.

Figure 1B:
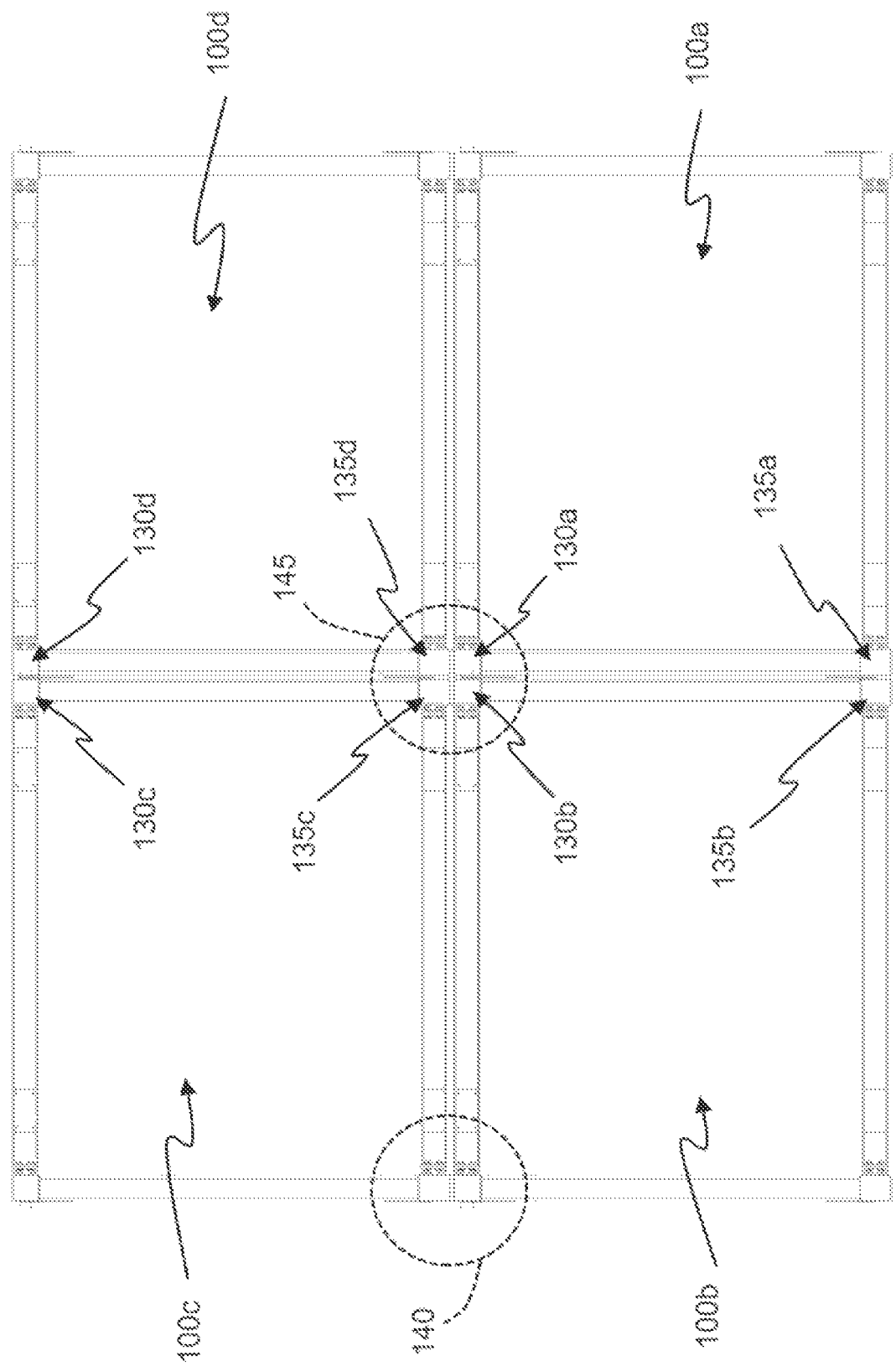
FIG. 1B is a diagram of four chassis stacked vertically and horizontally in a modular building configuration.
Figure 1C:
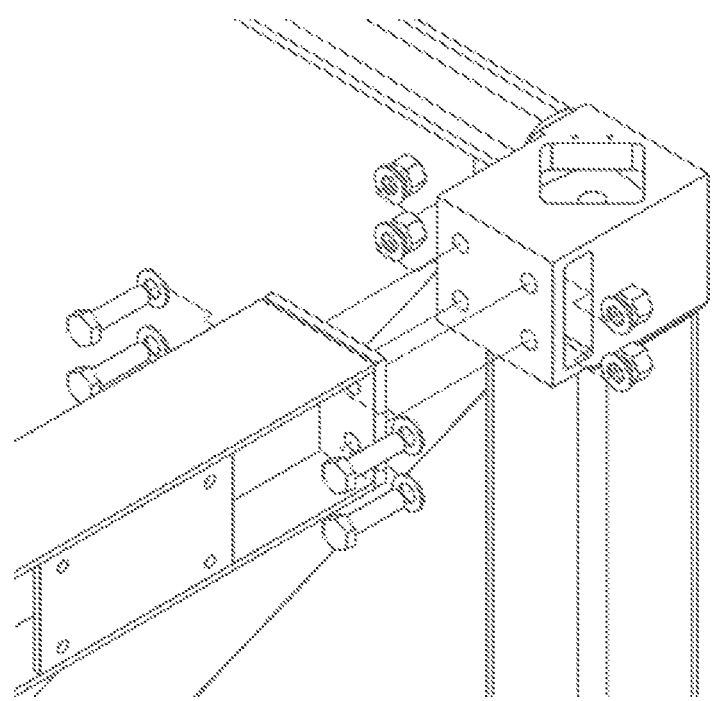
FIGS. 1C and 1D are views of different joining assemblies to attach the node to a horizontal support.
Figure 1D:
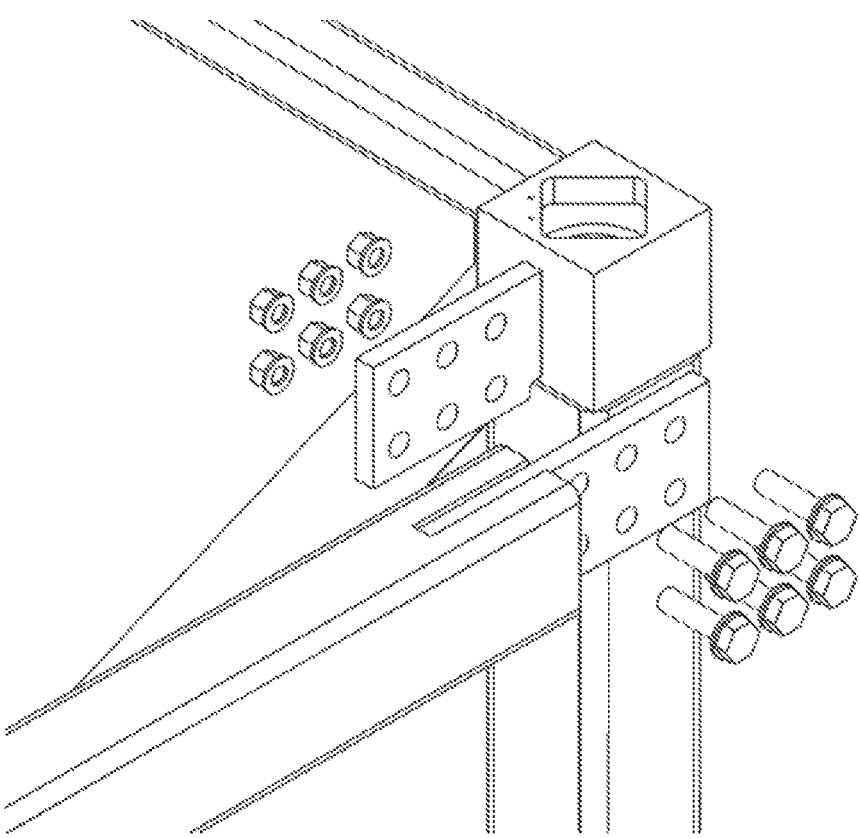

FIG. 1B is a diagram showing a side view of four chassis 100a, 100b, 100c, 100d stacked vertically and horizontally in a modular building configuration. During assembly of the building adjacent corner connecting parts are joined together to form connection nodes, such as nodes 140, 145. The number of horizontally and vertically adjacent corners in a given node depends on the arrangement of the modules. At a given node, both horizontally and vertically adjacent corners are attached to each other.

Figure 2:
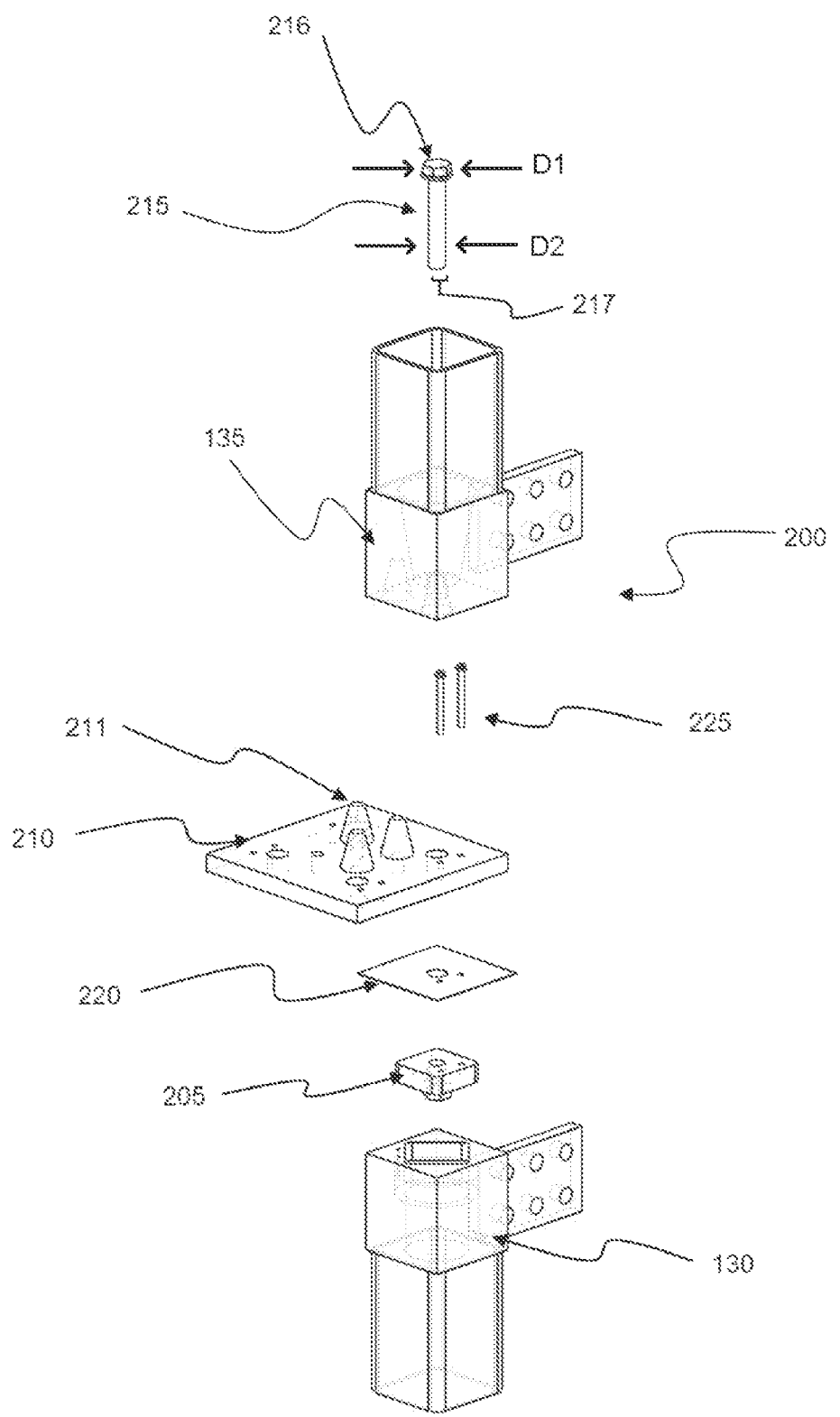
FIG. 2 is an exploded view of a connection node system according to aspects of the invention.

FIG. 2 is an exploded view of a connection node system 200 showing a top connecting part 130 and bottom connecting part 135 along with connecting hardware including a threaded coupler nut 205 (such as one having an integral threaded aperture or a separate captive threaded nut), a diaphragm plate 210, bolt 215, shims 220 and diaphragm temporary locking bolts 225. As discussed in more detail below, during construction the coupler nut is placed into and locked within connecting part 130. The diaphragm plate 210 is mounted over the top connecting part 130 and can be aligned and temporarily held in place with diaphragm locking bolts 225. The diaphragm plate 210 can be used to connect connecting part 130 to one or more adjacent connecting parts 130 from adjacent chasses 100 and different diaphragm plate configurations can be provided according to the number of corners at a node, such as two along the facade and four at an interior connection. The bottom connecting part 135 is attached to the top connecting part 130 using bolt 215.

Figure 3A:
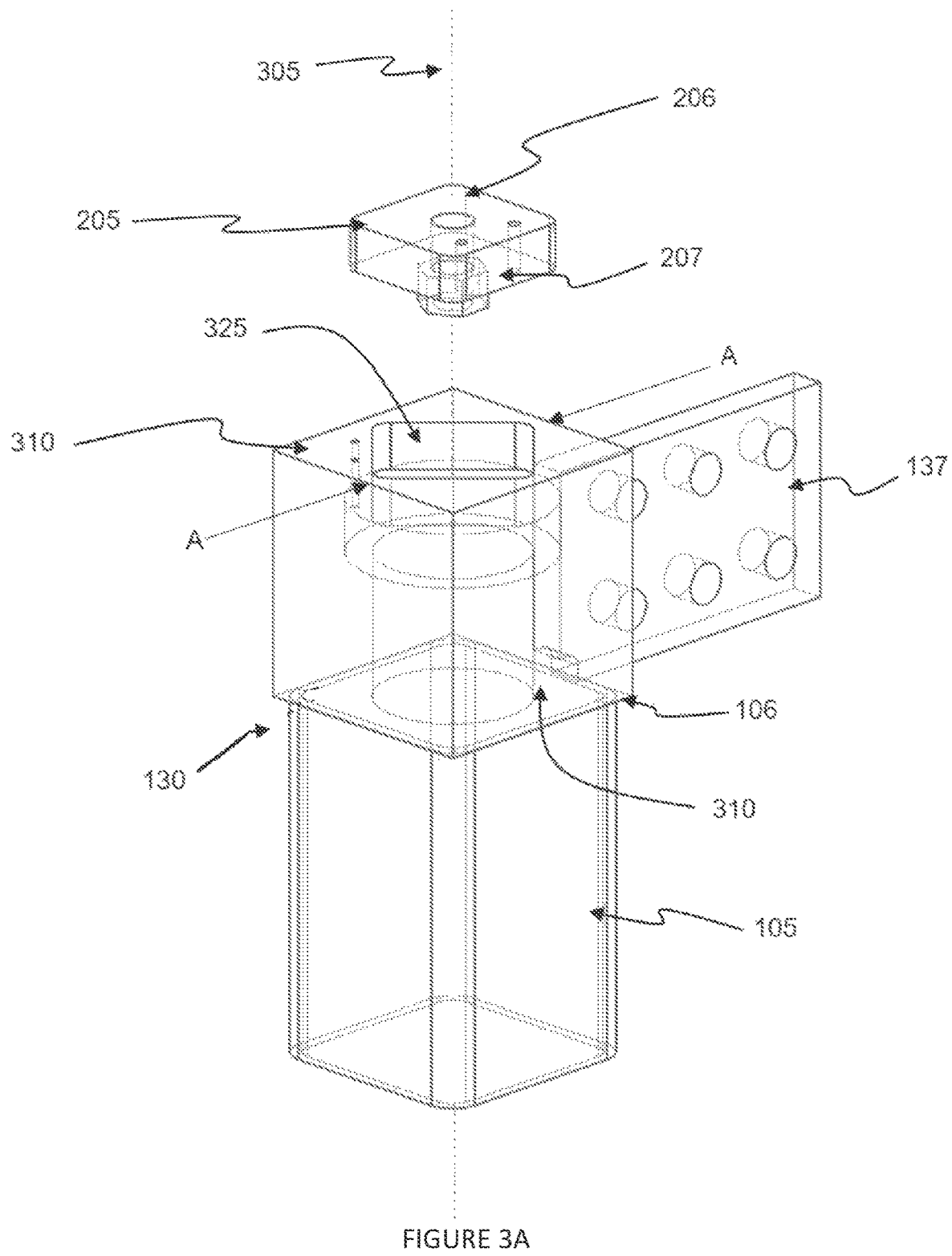
FIG. 3A is a detailed view of the top connecting part and coupler nut of the node connection system shown in FIG. 2.
Figure 3B:
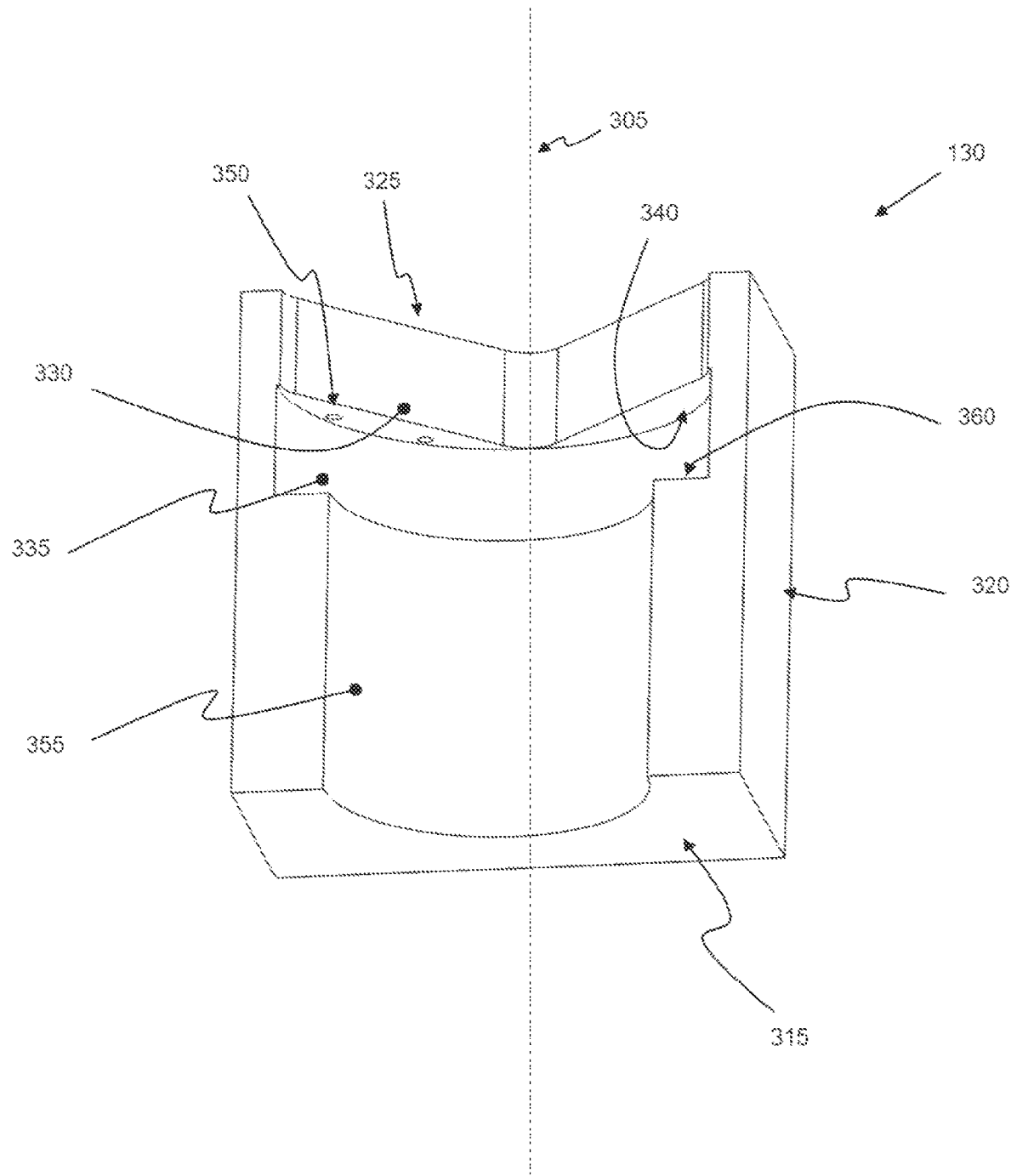
FIG. 3B is a cross section of the top connecting part of FIG. 3A along line A-A.

FIG. 3A is a more detailed view of the top connecting part 130 and coupler nut 205. FIG. 3B shows a cross section of the top connecting part 130 of FIG. 3A along line A-A. Top connecting part 130 is mounted at a top end 106 of a vertical support 105. In one configuration, the top connecting part 130 fits into the opening at the top end 106 of vertical support and can be welded or otherwise affixed into place. Other ways of joining the top connecting part 130 to the vertical support 105 can be used as well.

The top connecting part 130 has a top surface 310. Vertical support 105 defines a central axis 305. An axial hole 325 runs from the top surface 310 to the interior of the vertical support 105. Axial hole 325 is configured so that bolt 215 can pass completely through the top connecting part 130 and into the interior of the vertical support 105. In a particular embodiment, the axial hole 325 has a diameter throughout that is greater than the maximum diameter D of the head 216 of bolt 215 so the bolt 215 can be in any rotational orientation and still pass through top connecting part 130 into the vertical support 105. A narrower axial hole 235 could be provided if there is a need to prevent the bolt from passing into the vertical support unless it is in a correct rotational orientation.

The top connecting part defines a bottom surface 315 within the vertical support 105. Depending on the configuration of the top connecting could merge into the inner side walls of the vertical support 105 so that the bottom surface 315 is minimized (or absent entirely). Joining assembly 137 can comprise one or more flanges welded or otherwise affixed to respective sides 320 of the top connecting part 130 to allow attachment of horizontal supports. A flat mount for a butt joint or other connection structure could be provided instead.

The axial hole 325 has a first portion that is adjacent the top surface 310 and defines a first open area 330 into which the coupler nut 205 can be placed. A second portion of the axial hole defines a second open area 335 adjacent the first open area 330. The second open area 335 defines at least one shoulder 340 that is adjacent to the first open area 330. The coupler nut 205, first open area 330 and second area 335 are configured so that the coupler nut 205 when in an insertion position can pass through the first open area 330 and into the second open area 335 and can be rotated from the insertion position to a captured position where the shoulder 340 prevents removal of the coupler nut 205 through the first open area 330.

The coupler nut 205 has a triangular, square, or other angular or curved geometric shape with a horizontal diameter that is not the same along all azimuth angles. In the illustrated embodiment, the first open area 330 has substantially the same shape as the coupler nut 205 and is sized to allow the coupler nut 205 to be easily inserted without too much play. The second open area 335 has a circular cross section large enough to allow the coupler nut 205 to spin freely without too much play so that the aperture 206 in the coupler nut 205 remains substantially aligned with the central axis 305.

As discussed further below, the coupler nut is used for securing the top connecting part 130 to the bottom connecting part 135 in conjunction with the bolt 215. While the shape of the nut plate 205 and the first and second open areas 330, 335 can vary there is a balancing between increasing the surface area of the nut plate 205 that engages the shoulder 340 so that the assembly can withstand high forces involved in coupling chasses 100 together while also providing an opening large enough to allow easy access.

In a configuration where the vertical support 105 and coupler nut are both rectangular, the opening for the coupler nut is rotated relative to the vertical support 105 cross section, such as between 30 and 60 degrees, and in an embodiment substantially at 45 degrees. In this configuration, the final locked position of the coupler nut 205 engages a comparatively large amount of metal within the top connecting part 130 and increases the stress resistance of the total node assembly. Other relative rotational positions can be used for the design, including no rotation, which may make it easier to fabricate the top connecting part 130 by casting or other means.

Different shapes of the coupler nut 205, first open area 330, and second open area 335 could be used as long as capture of the coupler nut 205 in the second open area 335 can be achieved as discussed herein. In addition, the coupler nut 205 can be a single integral unit with the threaded aperture 206 formed directly therein. Alternatively, the threaded aperture 206 can be provided by a captive bolt 207 formed separately from and connected to the coupler 205.

Figure 3C:
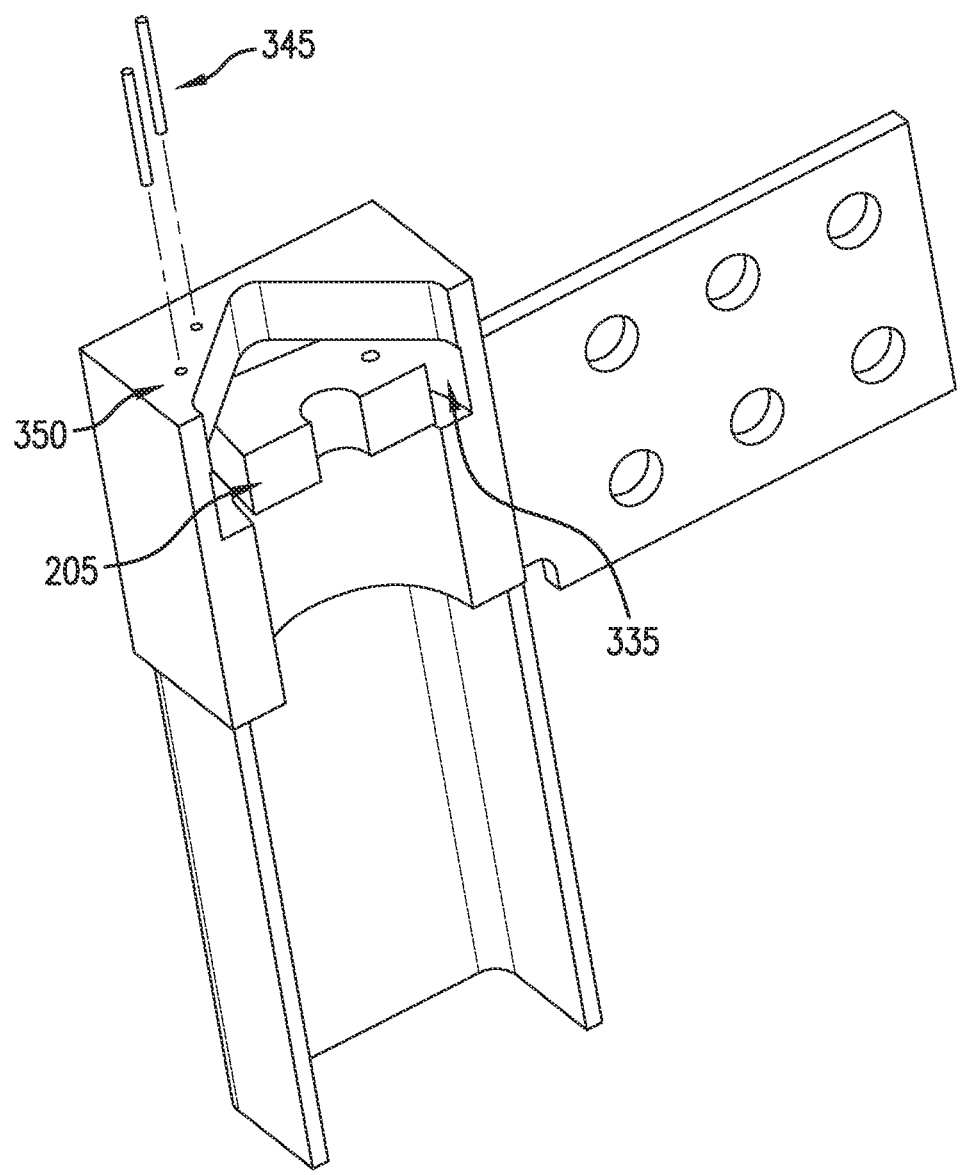
FIG. 3C is a cross section of the top connecting part of FIG. 3A with a coupler nut.

To retain the coupler nut 205 in the captured position, a locking pin 345 can be inserted through a coupler locking hole 350. The locking pin 345 extends into the second open area 335 and functions to restrict rotation of the coupler nut 205 from its captured position. FIG. 3C is a cross section of the top connecting part of FIG. 3A illustrating a seated coupler nut and locking pins 345. In the embodiment shown in FIG. 3C, two locking holes 350 are provided and positioned so that inserted locking pins 345 will bracket a corner of the coupler nut 205 and limit the amount the coupler nut can rotate so as to prevent its removal. In an alternative embodiment, locking holes 351 (not shown) can be formed in the coupler nut 205. The locking holes 350 are positioned so the locking pin 345 can pass into the locking holes 351 in the coupler nut.

Returning to FIG. 3B, a third open area 355 can be formed beneath the second open area 335. The third open area 355 defines shoulders 360 at the bottom of the second open area 335 that keep the coupler nut 205 within the second open area 335 so it does not fall into the vertical support 105. In the illustrated embodiment, the third open area 355 has a circular cross-section with a diameter that is less than the diameter of the second open area but greater than the diameter D of the bolt head 216.

Figure 4A:
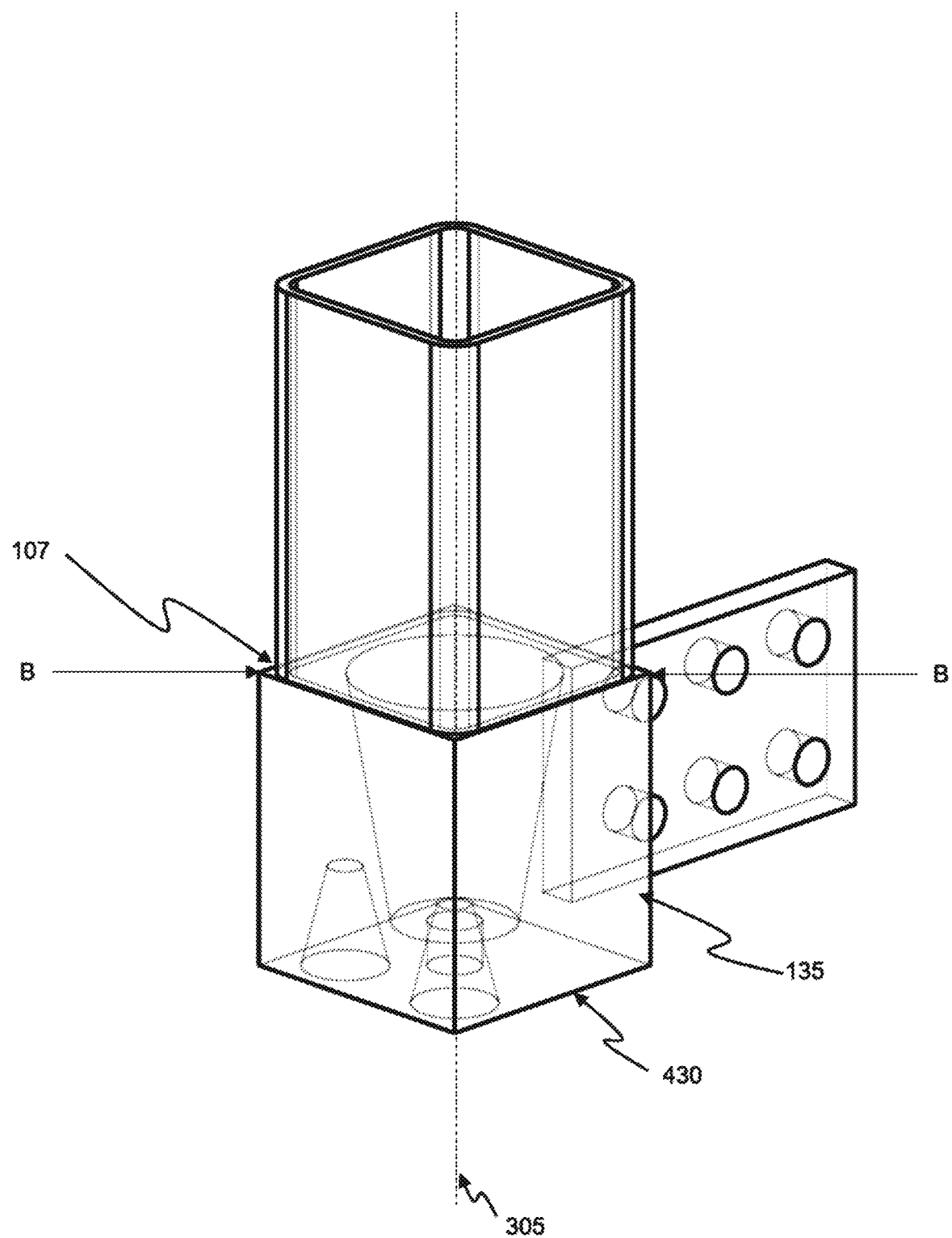
FIG. 4A is a detailed view of the bottom connecting part of the node connection system shown in FIG. 2.
Figure 4B:
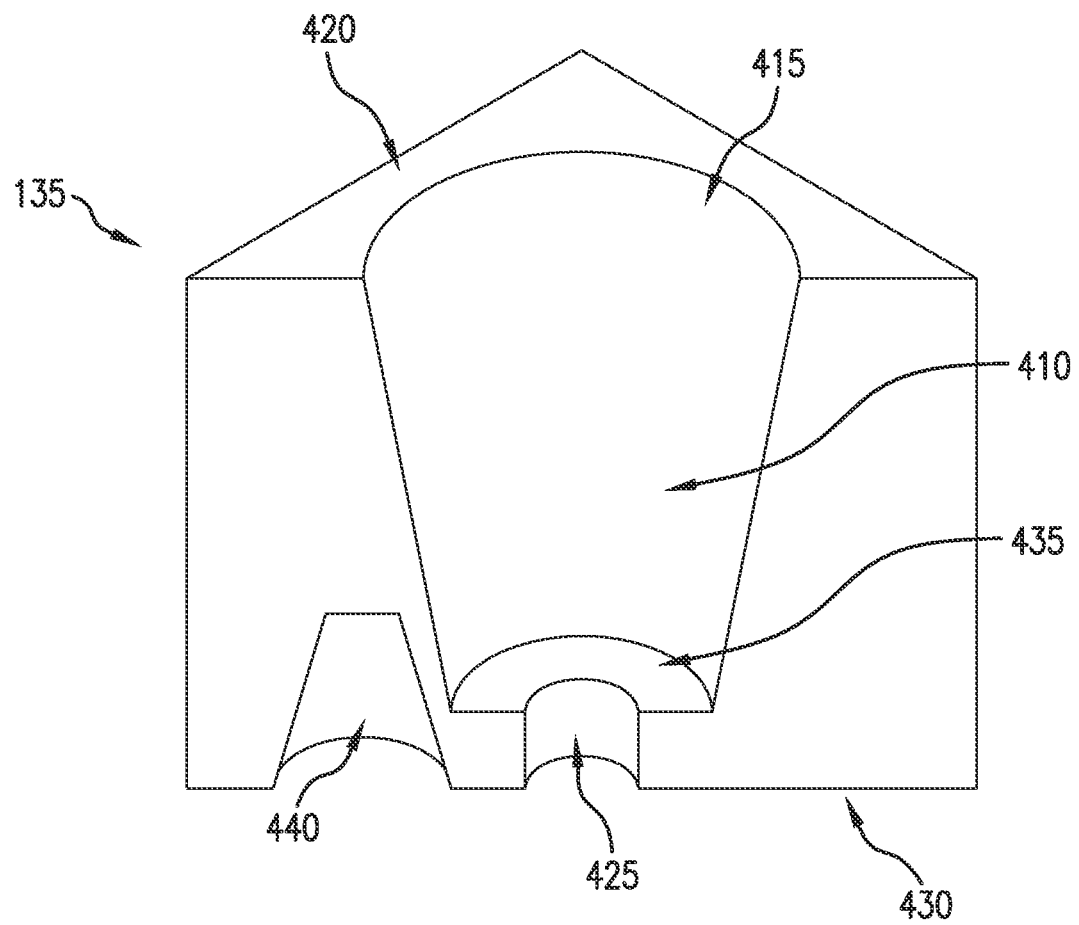
FIG. 4B is a cross section of the bottom connecting part of FIG. 4A along line B-B.

FIG. 4A is a more detailed view of the bottom connecting part 135. FIG. 4B shows a cross section of the bottom connecting part 135 of FIG. 4A along line B-B. Bottom connecting part 135 is mounted at a bottom end 107 of a vertical support 105 (shown in phantom in FIG. 4A). In one configuration, the bottom connecting part 135 fits into the opening at the bottom end 107 of vertical support 105 and can be welded or otherwise affixed into place. Other ways of joining the bottom connecting part 135 to the vertical support 105 can be used as well.

With reference to FIGS. 4A and 4B, bottom connecting part 135 has a bore 410 that extends through it along a central axis. The bore 410 has an upper bore part opening 415 at a top 420 of the bottom connecting part 135 and a lower bore part opening 425 that opens at the bottom 430 of the bottom connecting part 135. The diameter of the bore 410 at the upper opening 415 is greater than the bolt head 216 diameter D1 and the bore diameter throughout is greater than the diameter D2 of the shank 217 of bolt 215. Between top and bottom of the bore 425 is a constricted area through which the bolt shank 217 but not the bolt head 216 can pass.

In the illustrated embodiment, the upper bore part is conical and ends at a shoulder 435 on which the head 216 of the bolt 215 can rest when the bolt 215 is inserted into the bottom connecting part. The lower bore part is cylindrical with a diameter large enough to allow the bolt shank 217 to pass through easily and to provide sufficient clearance to accommodate normal fabrication, assembly, and erection tolerances, but to also maximize the contact area under the head of the bolt. Various other configurations of the upper and lower bore parts 415, 425 are possible. For example, the diameter of the bore 410 from the upper opening 415 to the shoulder 435 can be constant.

An alignment opening 440 can be provided in the bottom surface 430 and be configured to receive an alignment member 211 extending upwards from the diaphragm plate 210 during assembly of the connection node. The alignment opening 440 and alignment member 211 help to properly align the bottom connecting part 135 with the diaphragm plate and the top connecting part 130 in a lower chassis to which the diaphragm plate is connected. More than one alignment opening 440 can be provided. For example, multiple alignment openings 440 can be provided to allow the same bottom connecting part 135 to mount to a diaphragm plate 210 on the left or on the right.

Figure 5A:
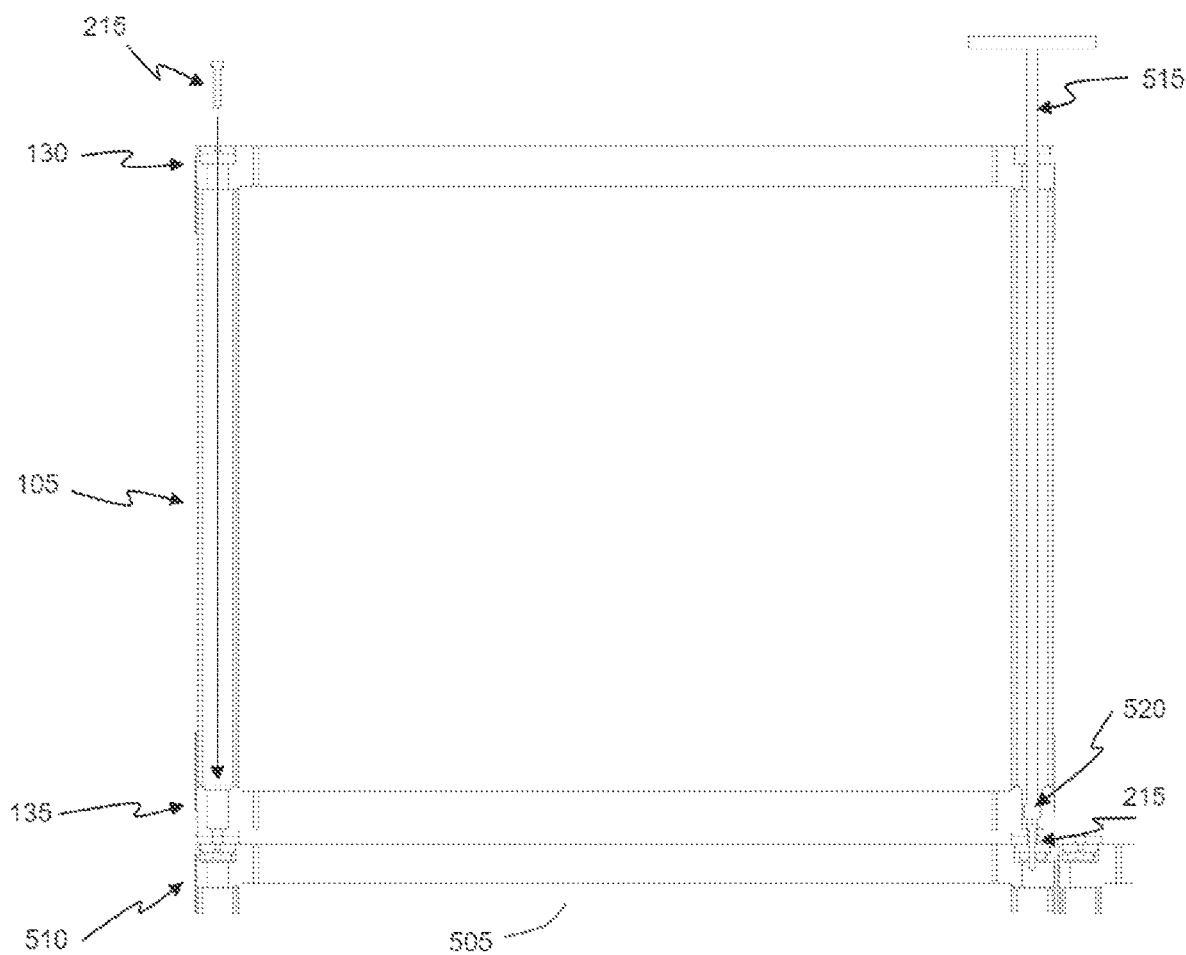
FIGS. 5A-5C illustrate a method for joining chassis in a modular building using the connection node assembly of FIG. 2.
Figure 5B:
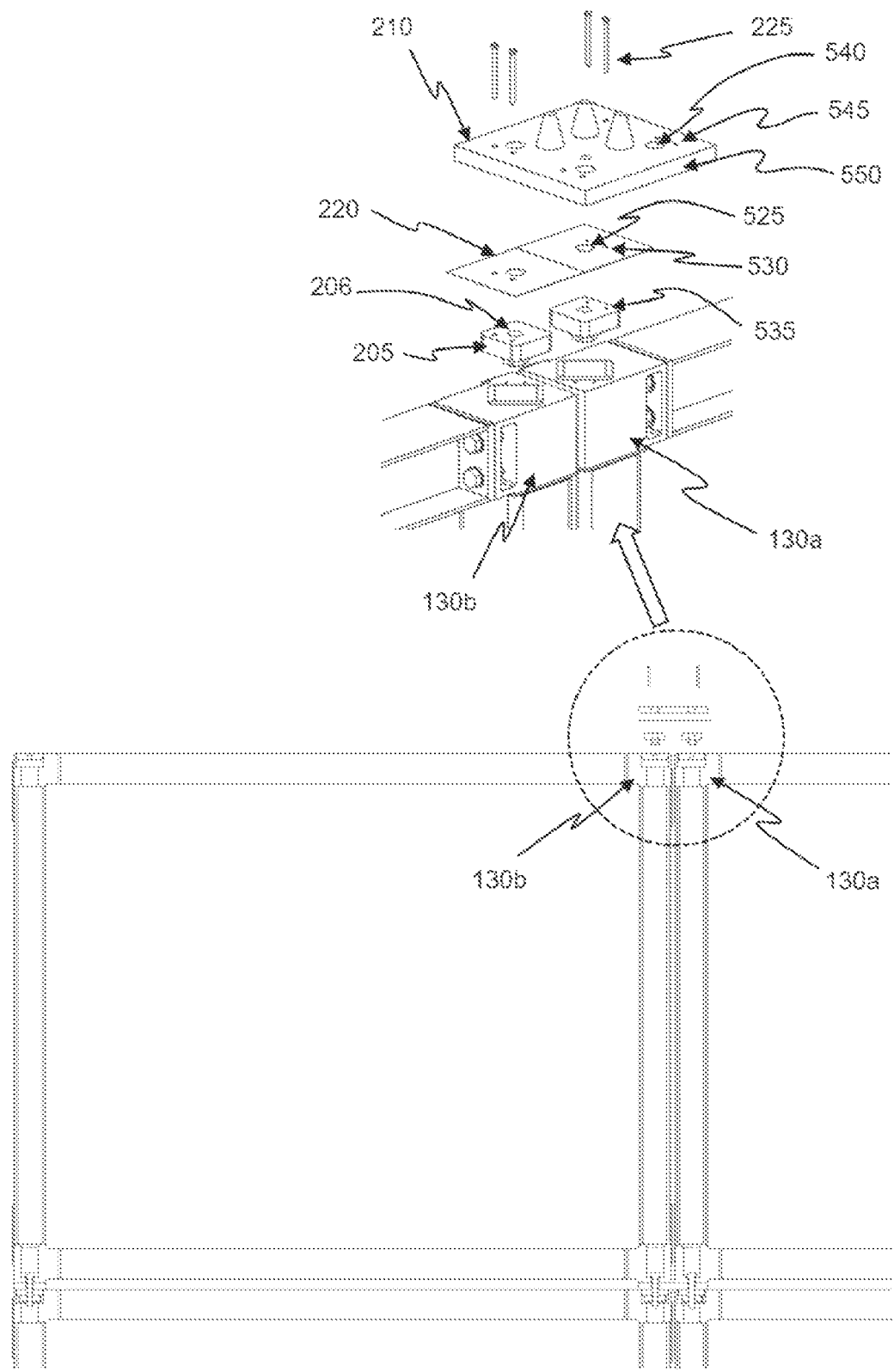
Figure 5C:
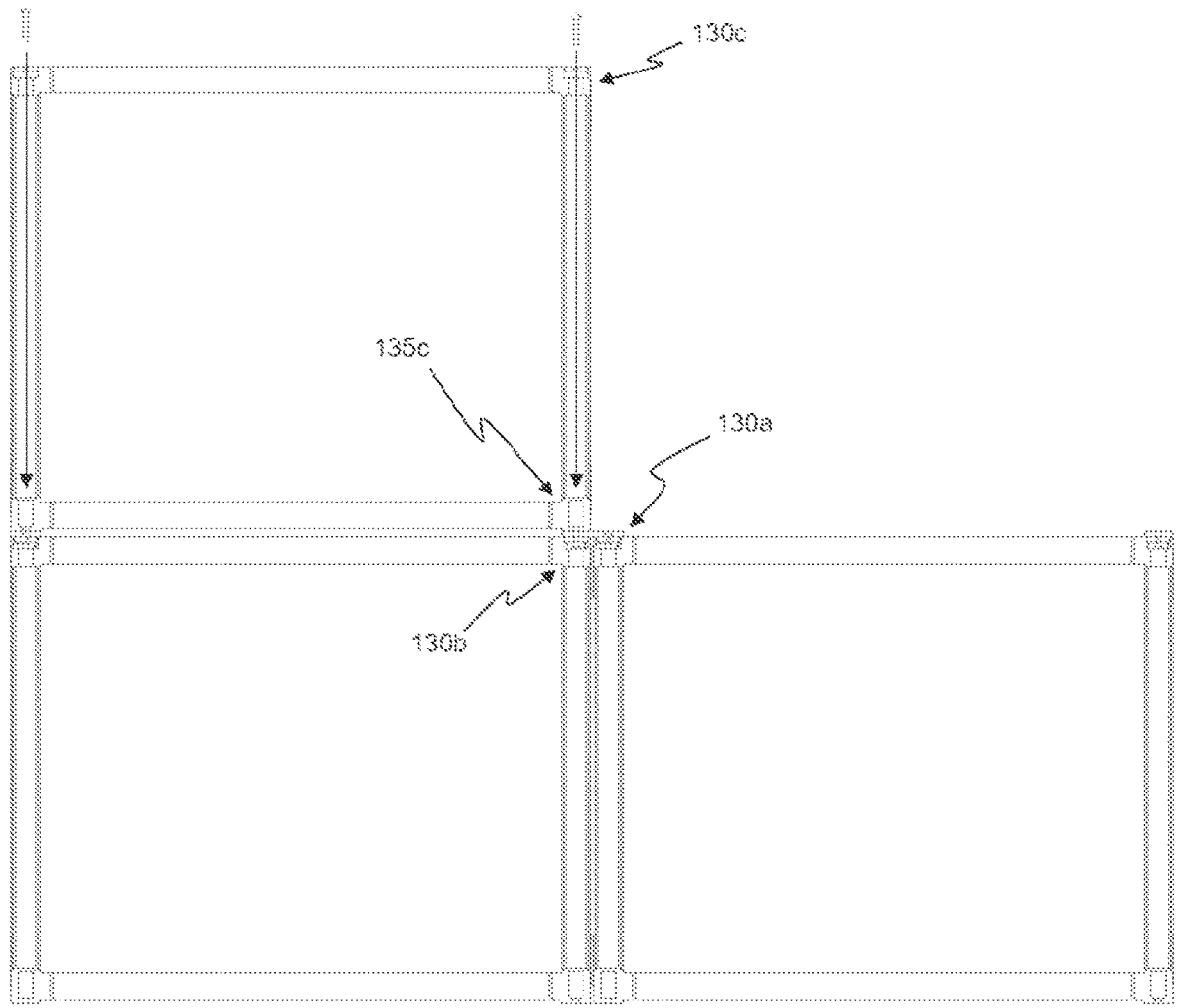

FIGS. 5A-5C illustrate a method for joining chassis in a modular building using the connection node assembly. FIG. 5A shows a first chassis mounted to a foundation 505. The foundation 505 has mounting points 510 to which the bottom connecting parts 135 of the chassis can be joined. The mounting points 510 can be modified versions of a top connecting part 130 or have another configuration for receiving bolt 215. FIG. 5A shows an already assembled chassis 100. It should be appreciated that the vertical support 105 with the top connecting part 130 and bottom connecting part 135 already connected can be provided as a single part for use during construction of a chassis 100.

Because of the unique configuration of the connection node system, once the chassis is aligned over the mounting points 510 it can be fixed in place without requiring a worker at the base of the chassis or inside of the chassis. Bolt 215 is dropped or otherwise lowered through the central bore 410 of the top connecting part 130. It passes through the hollow vertical support 105 and is captured by the bore 410 in the bottom connecting part 130. An elongated wrench assembly 515 can be inserted through the top connecting part 130 and lowered through the vertical support 105 until the socket 520 at the end of the wrench seats on the head of 216 of the bolt. Wrench assembly 515 is then used to tighten the bolt 215 and secure the chassis in place on the foundation 505. In an alternative embodiment, the bolt could be pre-inserted into the central bore before the chassis is lifted into place and temporarily held in place with wax, hot glue, or other similar substance.

FIG. 5B illustrates the connection of two adjacent top connecting parts 130a, 130b from horizontally adjacent chassis. A respective coupler nut 205 is mounted and locked into place as discussed above. The diaphragm plate 210 is then positioned over the top connecting parts 130a, 130b. One more leveling shims 220 can be added to adjust the vertical height of the diaphragm plate 210. The diaphragm plate and shims have bolt apertures 540, 525 through which a bolt 215 will later pass. To help align the aperture 540, 525 with the aperture 206 in the coupler nut 205, one or more alignment holes 545, 530 are formed on the diaphragm plate 210 and shim 220 respectively. One or more corresponding alignment holes 535 are formed on the coupler nut 205. When the coupler nut 205 is locked in place and the shim 220 and diaphragm plate 210 are properly positioned, the alignment holes 545, 525, 535 will be aligned. At this point locking bolts 225 can be inserted through holes 545, 525, 535 and serve to lock the diaphragm plate 210 and shim 220 in the proper place over the coupling nut 205. A temporary bolt (not shown) can also be passed through the bolt apertures 540, 525, 535. The position of a secured diaphragm plate can be surveyed to allow for repositioning of each floor to the building nominal coordinate system.

According to a particular method, when joining two adjacent top connecting parts 130a, 130b, the locking bolts 225 and temporary bolt are installed over only one top connecting part, such as 130a. Once a portion of the diaphragm plate 210 is secured to one chassis, such as chassis 130b, by the placement of another chassis above it (see FIG. 5C), the diaphragm plate 210 will then be held securely in place and the locking bolts 225 and temporary bolt can be removed so the locking bolts 225 do not interfere with the placement of the next chassis coming in. The temporary bolt also functions to close the main opening in the top connecting part to prevent water from getting into the hollow vertical support 105 if construction is occurring during wet weather. The bolt apertures 545 that receive the locking bolts 225 can have a diameter large enough to allow the locking bolts 225 to float in the holes to allow for misalignment. If misalignment is less of a concern, locking bolts 225 could be counterbored into the diaphragm plate 210 so removal is not needed.

The diaphragm plate 210 can be shaped and sized according to the number and arrangement corners of a chassis to be joined at the node. In an embodiment, the diaphragm plate 210 is configured so that it fully covers the top surfaces 310 of the top connecting parts 130 at the node and where the sides 550 of the diaphragm plate 210 are generally aligned with the exterior sides of the top connecting parts at that node. (See FIG. 7 discussed further below.)

Figure 8:
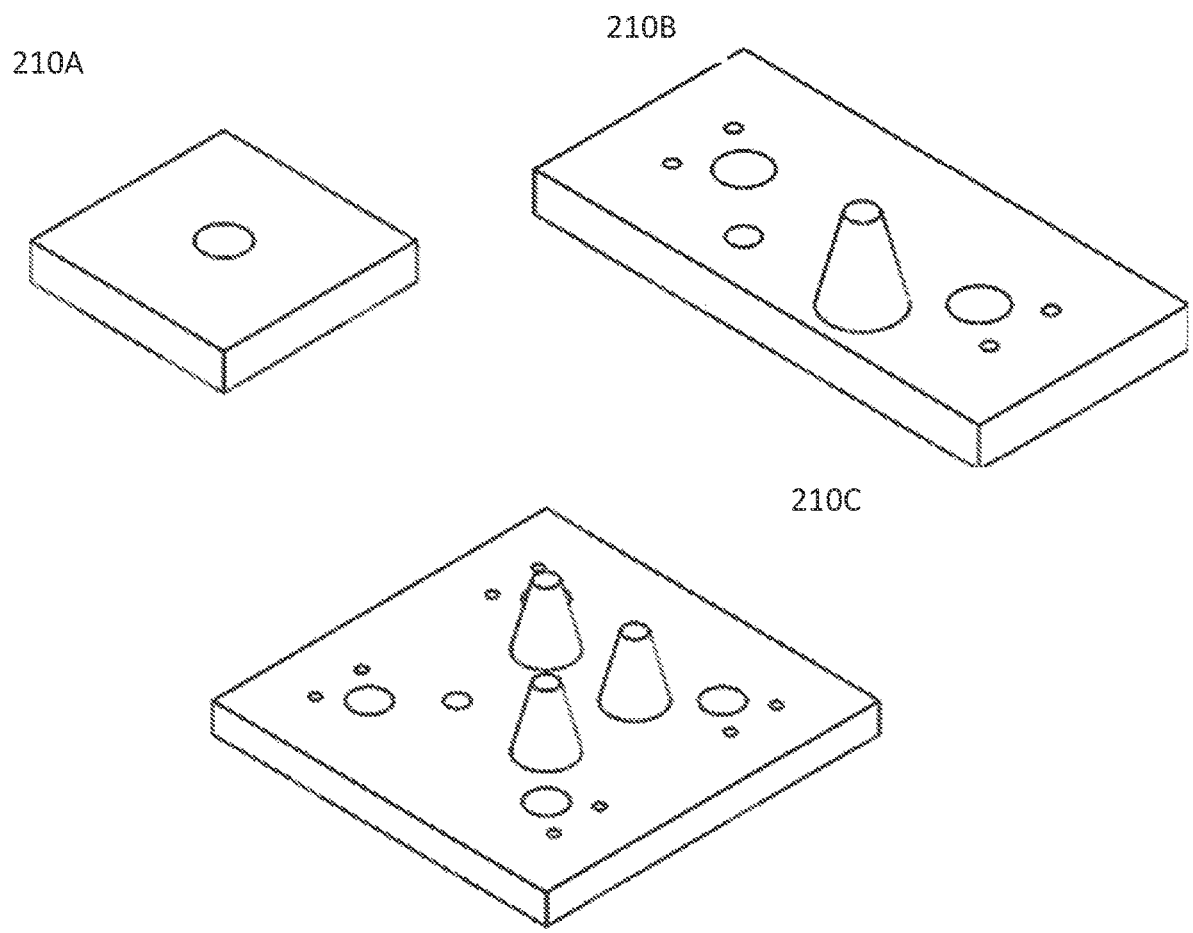
FIG. 8A illustrates various different diaphragm plate configurations.

The configuration of the alignment members can vary in different diaphragm plates 210 according to where in the structure the node is located and the stacking sequence of the chassis. In an embodiment, close fit cones are placed on the diaphragm plates used near the façade portions of the chassis to tightly control the position of the chassis in that area. Diamond cones are used on diaphragm plates at the other end of the chassis to control the rotation of the chassis. Depending on the stacking sequence and position, a given diaphragm plate can have anywhere from zero to four alignment members. Various different diaphragm plate configurations 210a, 210b, 210c are shown in FIG. 8. Differently configured alignment members known to those of ordinary skill in the art can be provided to, for example, position the chassis in x/y or manage rotation of the chassis about the alignment cone. The alignment members can be integrally formed with the diaphragm plate or the diaphragm plate can have suitable mounting apertures and the appropriate alignment members installed separately.

Figure 5D:
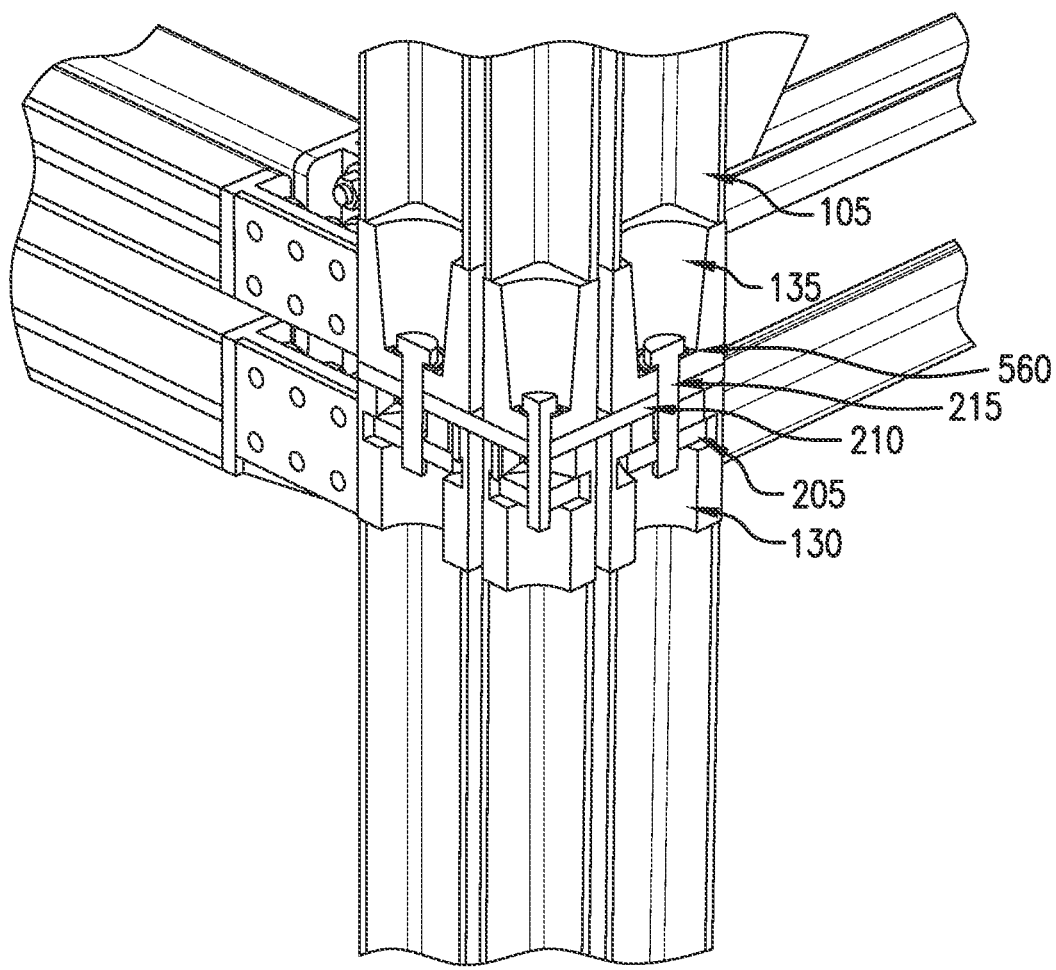
FIG. 5D shows a cross section view of a fully connected node assembly at an inner node where upper and four lower chasses come together.

FIG. 5C shows the installation of a third chassis over one of the chassis shown in FIG. 5B. With reference to FIG. 5C and FIG. 2, an upper chassis is lifted into place, its lower corners are generally aligned with the top corners of the chassis below, and then the chassis is lowered into place. One or more alignment members 211 on the diaphragm plate 210 mate with the corresponding alignment opening 440 at the bottom of bottom connecting part 135 to guide the upper chassis into proper alignment so that the central axis of the vertical supports 105 in the upper and lower chassis are aligned. FIG. 5D shows a cross section view of a fully connected node assembly at an inner node where upper and four lower chasses come together.

Figure 6A:
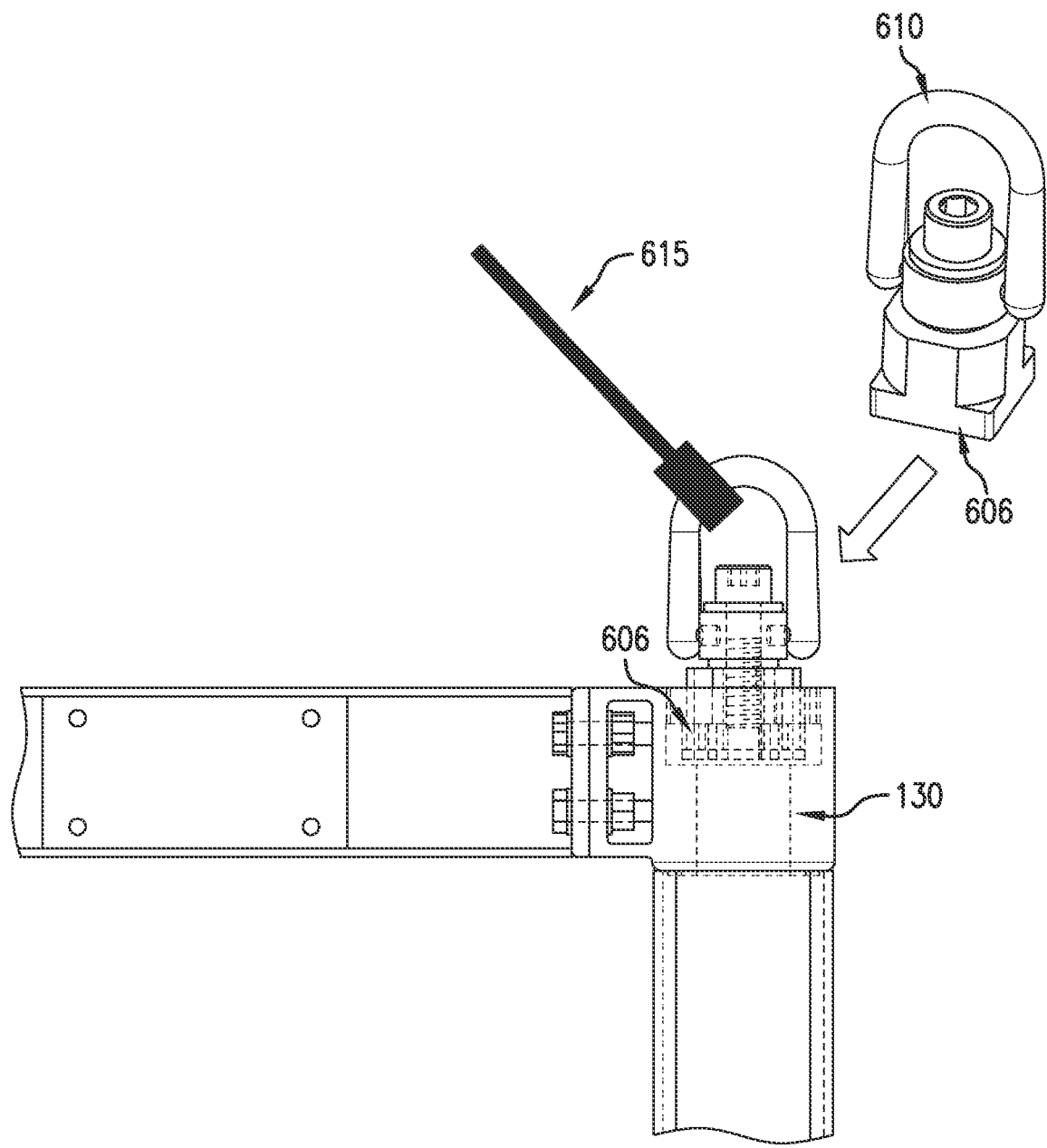
FIGS. 6A-6B illustrate use of a temporary nut plate in a top connecting part to provide lifting points of a chassis.
Figure 6B:
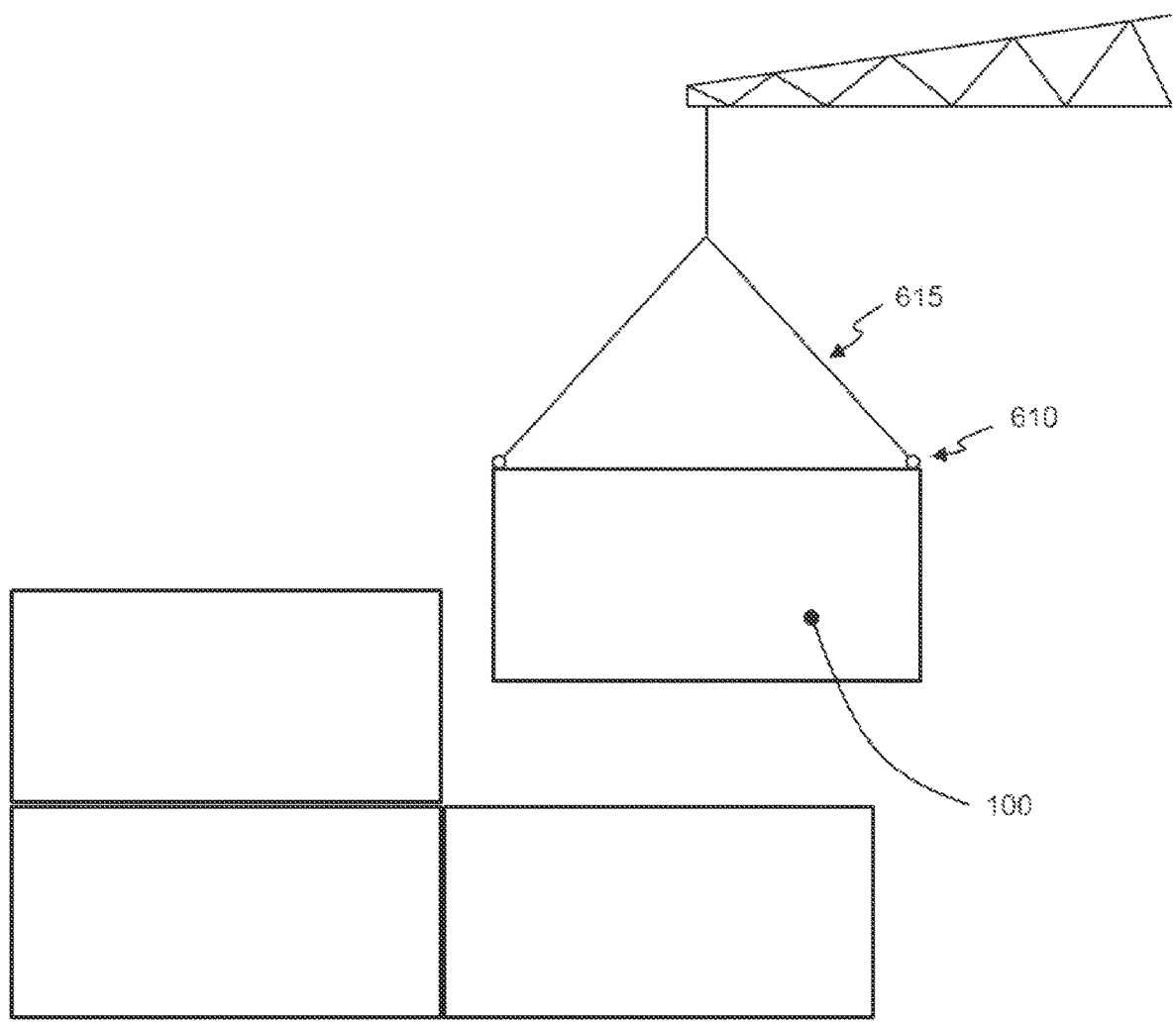

According to a further feature, and as shown in FIGS. 6A and 6B, a lifting plate 606 having a lifting eye 610 can be locked into the top connecting parts 130 in each corner of the chassis. The lifting plate has the same cross sectional shape as the coupler nut 205 and can be secured to the top connecting part in the same manner. Cables 615 can be connected to the lifting eyes for use in lifting the chassis into place. After placement, the substitute nut plate 606 can be removed. FIG. 6A shows one corner of a chassis 100 connected for lifting in this manner.

Returning to FIG. 5C, after the upper and lower chassis are aligned, bolts 215 can be inserted into the top connecting parts in the upper chassis, such as top connecting part 130c. The bolt 215 passes through the respective bottom connecting part 135 and engages the threaded aperture 206 in the coupling nut 205 mounted therein. The bolt 215 is then tightened using the elongated wrench assembly 515 (see FIG. 5) to couple the top and bottom connecting parts 130, 135 at each corner together. The bolted connection turns individual module columns connected along a vertical axis into continuous steel columns from the bottom to the top of the building. The bolted connect also clamps the diaphragm plate 210 between the chassis' columns and creates a tying load path laterally between all columns in the group. Once portion of the diaphragm plate 210 is clamped between one pair of chasses 100, any temporary bolts used to hold the diaphragm plate 210 in place over the top connecting parts 130 of other chassis 100 can be removed.

Figure 9:
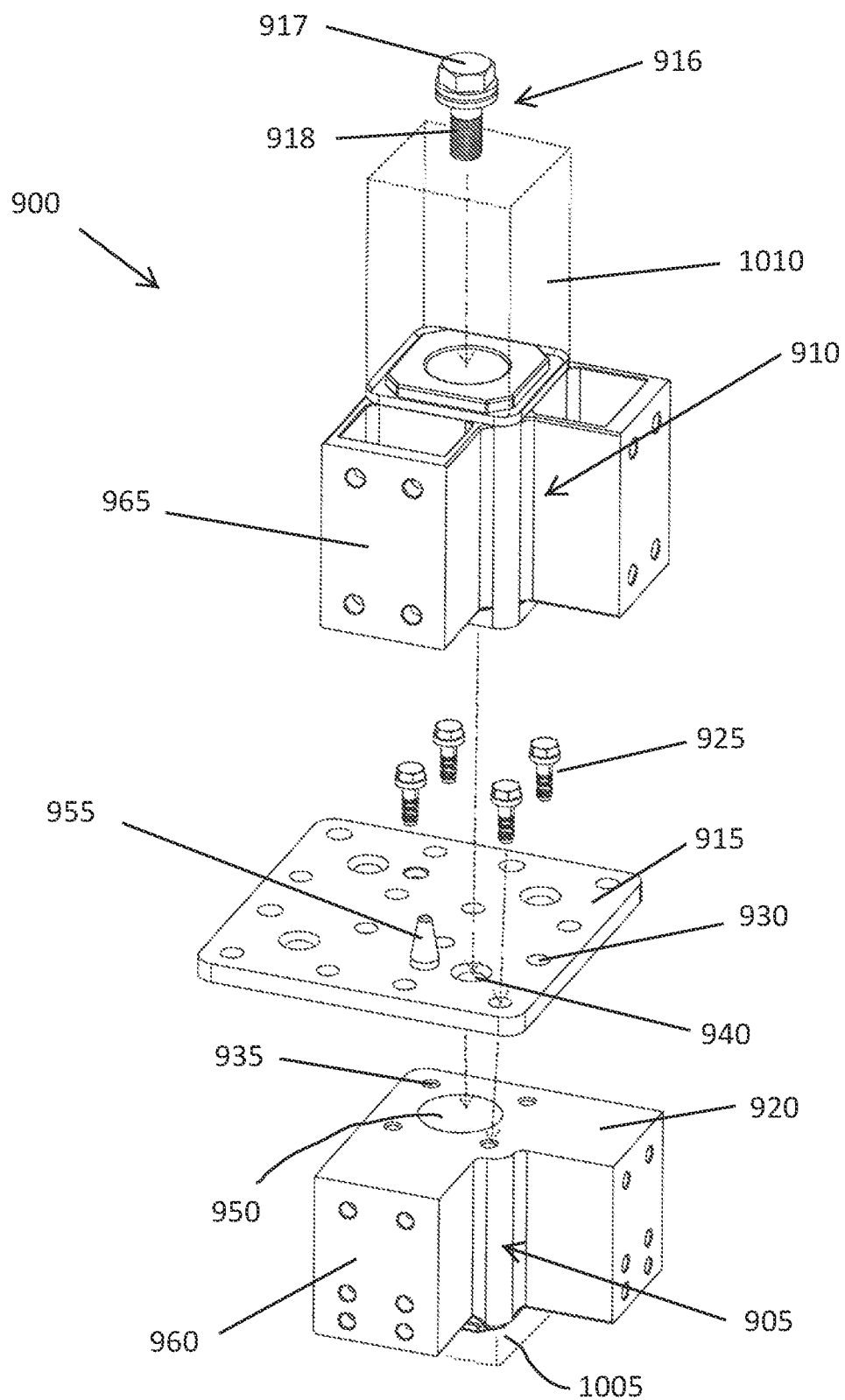
FIG. 9 an exploded view of a connection node system according to further aspects of the invention.
Figure 10:
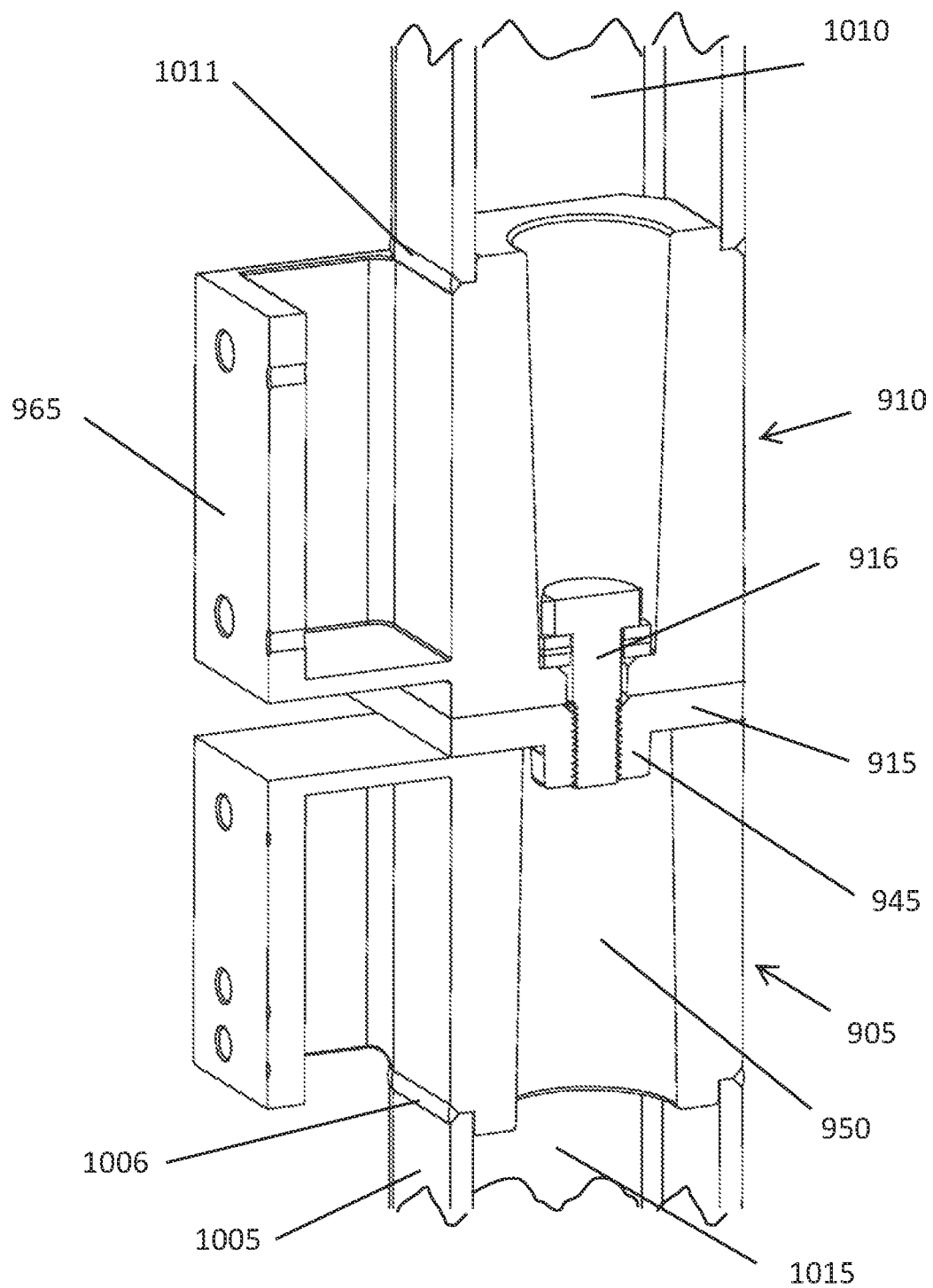
FIG. 10 is a cross-sectional view of the node system of FIG. 9 operating to couple vertical supports.
Figure 11:
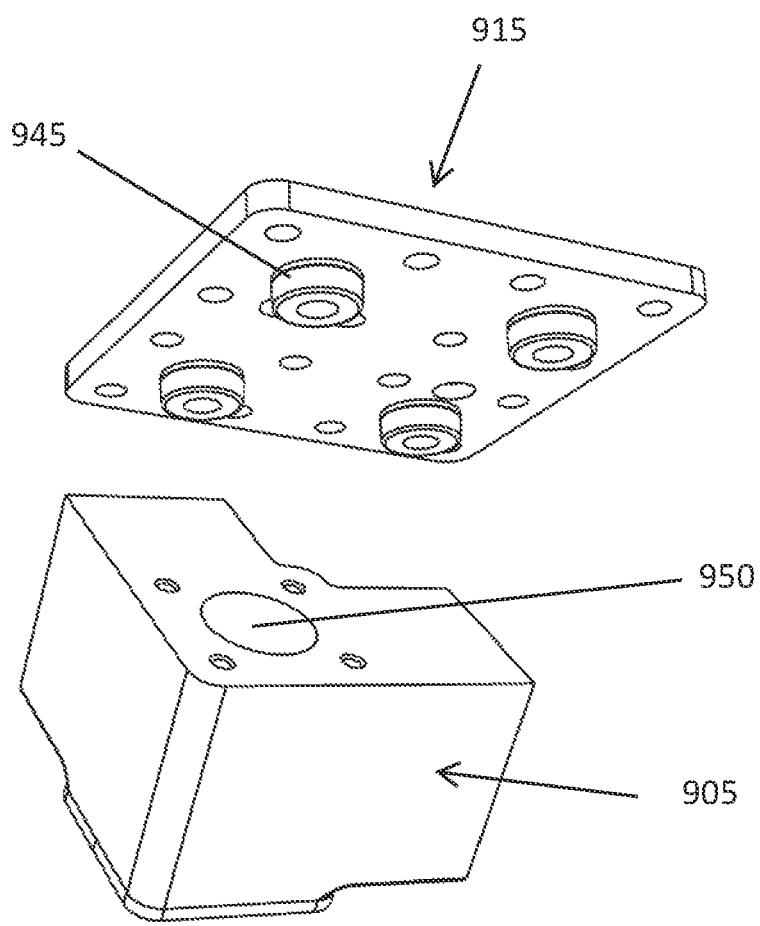
FIG. 11 is an exploded view of the top connecting part and underside of the diaphragm plate of FIG. 9.
Figure 12:
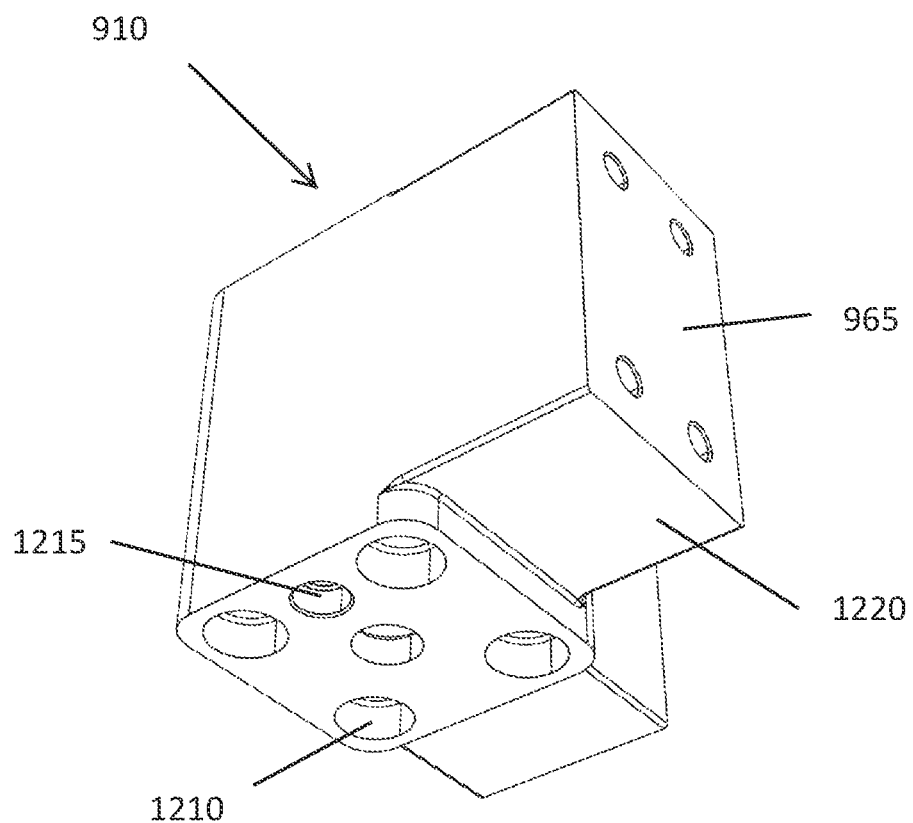
FIG. 12 illustrates the bottom surface of lower connecting part of FIG. 9.

FIG. 9 is an exploded view of a further embodiment of a connection node system 900 with a top connecting part 905 and a bottom connecting part 910 along with connecting hardware. Similar to node system 200 described above, node system 900 is used to connect axially aligned vertical supports 1005, 1010 using a bolt 916 that is passed through the interior of the support 1010 where it seats in connecting part 910 with its shaft extending therefrom to engage a threaded coupler affixed to the top portion of connecting part 905. FIG. 10 is a cross-sectional view of the node system 900 operating to couple the vertical supports 1005, 1010 with the top connecting part 905 attached to the top 1006 of support 1005 and the lower connecting part 910 connected to the bottom 1011 of support 1010. FIG. 11 is an exploded view of the top connecting part 905 and the underside of a diaphragm plate 915. FIG. 12 illustrates the bottom surface of lower connecting part 910.

With reference to FIGS. 9-12, in this embodiment, the separate coupler nut has been combined with the diaphragm plate 915. As illustrated, diaphragm plate 915 has a coupling aperture 940 with a threaded coupler extension 945 descending therefrom. Diaphragm plate 915 can be affixed to the top connecting part 905 using bolts 925 which pass through openings 930 in the diaphragm plate 915 and engage threaded apertures 935 in the upper surface 920 of the top connecting part 905. The openings 930 in the diaphragm plate 915 can be oversized relative to the shank diameter of the bolts 925 so that the lateral position of the coupling diaphragm plate 915 relative to the top connecting part 905 can be adjusted during installation. In this embodiment, when the diaphragm plate 905 is mounted to the upper surface 920 of the top connecting part 905, the threaded coupler extension 945 extends into an axial hole 950 of the top connecting part 905, and wherein the axial hole 950 opens into the interior 1015 of the vertical support 1005.

Axial hole 950 in the top connecting part 905 is configured so that when the diaphragm plate 915 is not mounted to the top connecting part 905, the bolt 916 can pass completely through the axial hole 950 and into the interior 1015 of the vertical support 1005. In a particular embodiment, the axial hole 950 has a diameter throughout that is greater than the maximum diameter of the head 917 of bolt 916 (and accounting for any washers that may be mounted on the bolt).

As shown in FIG. 10, the interior structure of bottom connecting part 910 is substantially the same as the bottom connecting part 135 described above and reference is made herein to that description. With reference to FIG. 12, the bottom surface 1205 of bottom connecting part 910 further comprises apertures 1210 positioned to receive the tops of the bolts 925 connecting the diaphragm plate 915 to the top connecting part 905.

An alignment member 955 can be mounted to and extend upwards from the diaphragm plate 915. An alignment hole 1215 can be provided on the bottom surface 1205 of the lower connection part 910. Analogous to the diaphragm plates shown in FIG. 8, the diaphragm plate 915 can be configured for use with multiple adjacent node systems 900 and operate to couple the adjacent nodes to each other. In the embodiment shown in FIG. 9, the diaphragm plate 915 is configured for use with a cluster of 4 adjacent nodes.

Similar to the system 200 addressed above, the embodiment 900 can also include one or more assemblies to allow attachment of horizontal supports to the top and bottom connecting parts 905, 910. In FIG. 9 butt joints 960, 965 are illustrated and are similar to the structures that shown in FIG. 1C. A bottom surface 1220 of butt joint 965 on lower connection part 910 is elevated above the bottom surface 1205 of connection part 910 similar to the elevated flange shown in FIG. 4A. When the node components are assembled this offset leaves a gap (see FIG. 10) that can accommodate a sealing or other layer formed on the top surface of a lower module on which an upper module is being placed.

In use, top and bottom connection parts 905, 910 can be attached to the top and bottom of vertical supports in a building module. Analogous to the discussion with respect to FIG. 5A above, an upper module having a vertical support 1010 with a respective bottom connecting part 910 mounted at its bottom end 1011 is placed on top of and in alignment with a vertical support 1005 of a lower module, and where vertical support 1005 has a respective top connecting part 905 connected to a top of 1006 of support 1005 and having the diaphragm plate 915 in place. The vertical support 1010 of the upper module has its own respective top connection portion 905 with axial hole 950. Bolt 916 can be inserted into the axial hole 950 and lowered through vertical support 1010 to seat in the bottom connecting part 910. Bolt 916 can be rotated to engage the shaft 918 extending from the bottom connecting part 910 with the threaded coupler extension 945 mounted to the top of top connecting part 905 on the vertical support 1005 to affix the two vertical supports 1005, 1010 to each other.

Figure 7:
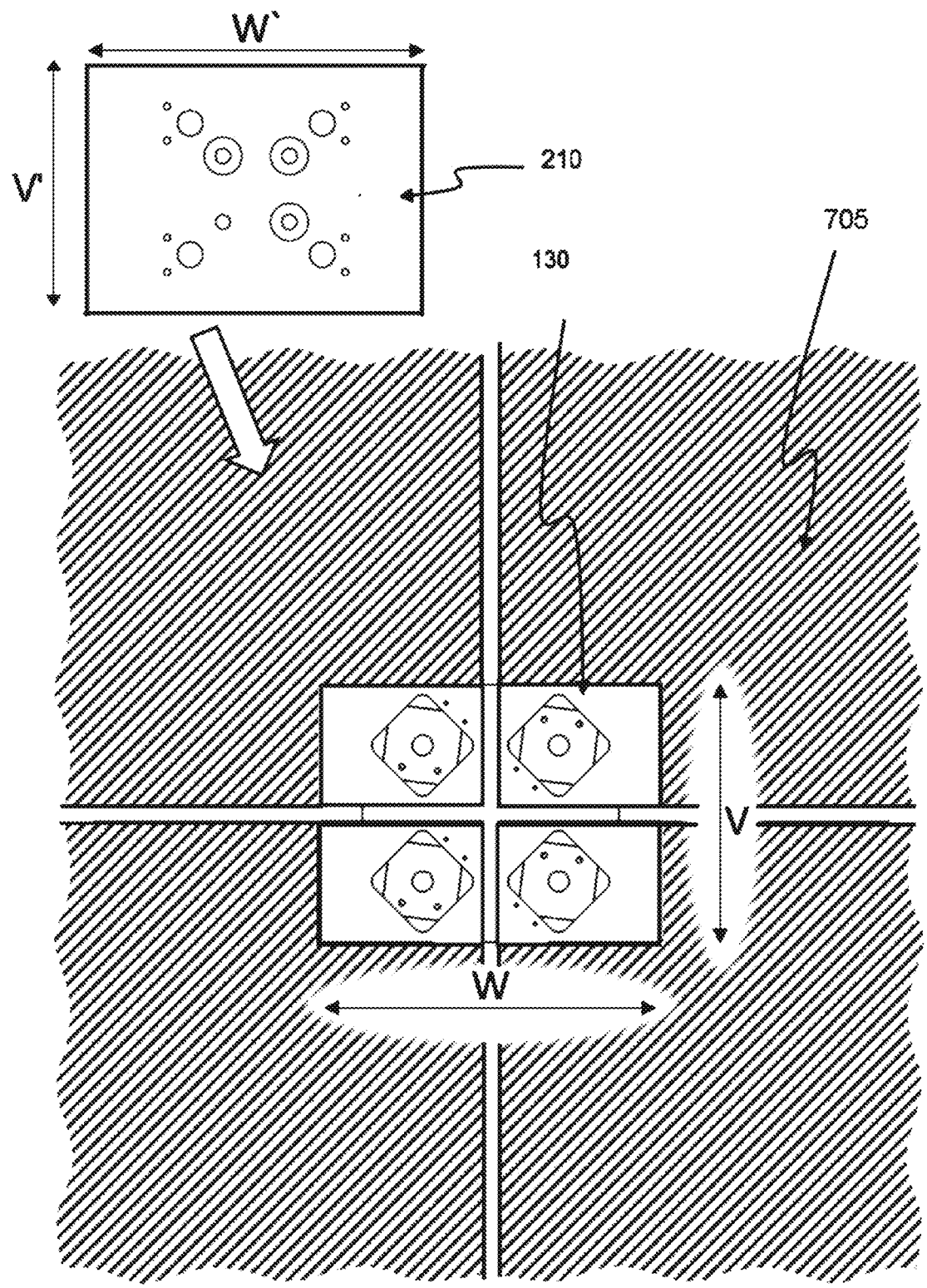
FIG. 7 illustrates the top of four adjacent chassis prior to installation of the diaphragm plate thereon.

Advantageously, disclosed node system 200, 900 allows node horizontal and vertical chassis to be coupled to each other with only the top connecting parts 130 of each chassis 100 being exposed on the top 705 of an otherwise weather sealed chassis, such as shown in FIG. 7 which illustrates the top of four adjacent chassis prior to installation of the diaphragm plate 210. Once multiple modules are stacked, the nodes will define a rectangle having dimensions W by V. The diaphragm plate 210 which is used in this configuration will generally be a rectangle having dimensions W' by V' where W' is substantially equal to or less than W and V' is substantially equal to or less than V so that the entire top surface of the vertical supports will be covered. The vertical diaphragm plate could also be sitting in a recess rather than proud of the fireproofing and weatherproofing. Such a recess can be formed by using vertical supports 105 that do not extend fully to the top of the horizontal supports.

Advantageously, the top of the chassis (apart from the top connecting parts) and any weather barrier formed on the top can remain undisturbed and the risk of water or other contaminants entering the interior of the chassis from the top reduced or avoided entirely.

In addition, the entire assembly can be done from the top of each chassis. Workers are not required to access any internal portions of the chassis, thereby limiting the possibility for internal damage and reducing worker risk.

Various aspects, embodiments, and examples of the invention have been disclosed and described herein. Modifications, additions and alterations may be made by one skilled in the art without departing from the spirit and scope of the invention as defined in the appended claims.

The invention claimed is:

1. An apparatus for connecting building components, the apparatus comprising:
 a hollow support having an interior and extending along a central axis from a first end to a second end, the first end of the support having a first connection portion attached thereto and the second end of the support having a second connection portion attached thereto;

the first connection portion comprising a respective outer surface substantially perpendicular to the central axis and a respective inner surface adjacent the interior of the support, the first connection portion having a bore therein from the outer surface to the inner surface, the inner surface defining a shoulder adjacent the bore, an inner wall extending upwards from the shoulder and defining a funnel that expands towards the second end of the support;

the second connection portion comprising a respective outer surface having an axial hole passing therethrough into the interior of the support;

wherein a respective bolt having a respective head with a head diameter and a shank with a shank diameter can pass through the axial hole of the second connection portion, through the support and seat in the first connection portion with the head of the bolt engaging the shoulder of the first connection portion and the shank extending through the bore of the first connection portion; and a coupler having a threaded aperture therein, the coupler being removably attachable to the second connection portion to position the threaded aperture in alignment with the axial hole of the second connection portion, each threaded aperture sized to be engaged by a threaded portion of a respective bolt with a shank of the shank diameter.

2. The apparatus of claim 1, wherein the coupler comprises a plate having a first surface and a second surface, the threaded aperture extending between the first surface and the second surface therein, the plate being removably attachable to the second connection portion wherein the second surface of the plate is facing the outer surface of the second connection portion.

3. The apparatus of claim 2,
the plate having a mounting opening therein extending between the first surface and the second surface,
the outer surface of the second connection portion having a threaded mounting aperture therein,
wherein the plate can be positioned on the outer surface of the second connection portion with the threaded aperture in alignment with the axial hole and coupled to the second connection portion using a bolt passing through the mounting opening and engaging the mounting aperture.

4. The apparatus of claim 3, a diameter of the mounting opening being oversized relative to a shank diameter of the bolt, wherein a lateral position of the plate relative to the second connection portion is adjustable when the bolt is extending through the mounting opening and engaged in the mounting aperture.

5. The apparatus of claim 2, the plate having a coupler extension depending from the inner surface of the plate and with a portion of the threaded aperture therein, wherein when plate is attached to the second connection portion, at least part of the coupler extension is within the axial hole of the second connection portion.

6. The apparatus of claim 2, the first connecting part further comprising an alignment opening in the first connecting part outer surface,
the plate having an alignment member extending away from the second surface and having dimensions compatible with dimension of the alignment opening.

7. A building support assembly comprising:
a plurality of support members;
each respective support member comprising:
a hollow support beam having an interior and extending along a respective central axis from a first end to a second end, the first end of the support having a respective first connection portion attached thereto and the second end of the support having a respective second connection portion attached thereto;
the respective first connection portion comprising an outer surface substantially perpendicular to the respective central axis and an inner surface adjacent the interior of the support, the first connection portion having a bore therein from the outer surface to the inner surface, the inner surface defining a shoulder adjacent the bore, an inner wall extending upwards from the shoulder; and
the respective second connection portion comprising an outer surface having an axial hole passing therethrough into the interior of the support;
wherein a respective bolt having a respective head with a head diameter and a shank with a shank diameter can pass through the axial hole of the second connection portion, through the support and seat in the first connection portion with the head of the bolt engaging the shoulder of the first connection portion and the shank extending through the bore of the first connection portion;
a coupler having a plurality of threaded apertures therein, each threaded aperture sized to be engaged by a threaded portion of a respective bolt with a shank of the shank diameter;
wherein, when the plurality of support members are positioned substantially parallel to each other with the first connection portions of plurality of support members adjacent and the second connection portions adjacent, the coupler can be removably and simultaneously attached to the respective second connection portion of each of the plurality of support members and with each respective threaded aperture in the coupler in alignment with the axial hole of the second connection portion in a corresponding respective support member.

8. The assembly of claim 7, the coupler comprises a plate having a first surface and a second surface, the threaded apertures extending between the first surface and the second surface therein.

9. The assembly of claim 8,
the plate having a plurality of mounting opening therein extending between the first surface and the second surface,
the outer surface of the second connection portion of each respective support member having a respective threaded mounting aperture therein, wherein the plate can be removably attached to the second connection portions of the plurality of support members using respective bolts passing through respective mounting openings and engaging respective mounting apertures.

10. The assembly of claim 8, a diameter of the mounting openings being oversized relative to a bolt shank diameter compatible with the respective mounting apertures.

11. The assembly of claim 8, the plate having a plurality of coupler extensions depending from the inner surface of the plate, each coupler extension having a portion of a respective threaded aperture therein, wherein when plate is attached to the second connection portions of the plurality of support members, at least part of each respective coupler extension is within the axial hole of the second connection portion of a corresponding respective support member.

12. The assembly of claim 8, the first connecting part of each respective support member further comprising a respective alignment opening in the first connecting part outer surface, the plate having a plurality of alignment member extending away from the second surface and having dimensions compatible with dimension of the alignment opening.

13. A method for assembling a structure using a plurality of bolts, each bolt having a head with a head diameter and a shank with a shank diameter less than the head diameter, the method comprising the steps of:
(a) providing a plurality of building modules,
each respective module comprising a vertical support member positioned along a vertical edge and extending from substantially a bottom of the respective building module to a top of the respective building module, each respective support member comprising an elongated hollow body having a central axis, a bottom connection portion at a bottom of the module and a top connection portion at a top of the module, the top connection portion of the respective support member having an axial hole therein large enough to allow a respective bolt to freely pass fully through and into the interior of the hollow body, the bottom connection portion of the respective support member comprising a bottom wall having an axial bore therein, a first region of the axial bore having a first diameter greater than the bolt head diameter, a second region of the axial bore downward from the first region having a second diameter greater than the bolt shank diameter and less than the bolt head diameter;
(b) placing a first building module having a first support member on a substrate;
(c) attaching the first support member to the substrate using a first bolt that has been inserted into the first support member through the top connection portion of the first support member so that the first bolt shank extends through the axial bore of the bottom connection portion of the first support member;
(d) placing a second building module having a second support member on the substrate so that the second support member is adjacent the first support member of the first building module;
(e) attaching the second support member to the substrate using a second bolt that has been inserted into the first support member through the top connection portion of the first support member so that the first bolt shank extends through the axial bore of the bottom connection portion of the first support member;
(f) providing a coupler having at a first threaded aperture therein; and
(g) attaching the coupler to the top connection portion of the first support member so the first threaded aperture is substantially in alignment with the axial hole of the top connection portion of the first support member.

14. The method of claim 13, the coupler comprising a coupler plate having a first surface and a second surface, the first threaded aperture extending between the first surface and the second surface therein,
the step of attaching the coupler to the top connection portion of the first support member comprising attaching the plate to the top connection portion of the first support member wherein the second surface of the plate is facing the outer surface of the top connection portion of the first support member.

15. The method of claim 14, the coupler having a second threaded aperture therein, the method further comprising the step of attaching the coupler to the top connection portion of the second support member, wherein the second threaded aperture is substantially in alignment with the axial hole of the top connection portion of the second support member and the second surface of the plate is facing the outer surface of the top connection portion of the second support member;
the plate physically connecting the first support member to the second support member.

16. The method of claim 15, the first and second threaded apertures in the coupler having a respective first and second coupler extension depending from the inner surface of the plate;
the step of attaching the coupler to the top connection portion of the first support member comprises inserting the first coupler extension into the axial hole of the top connection portion of the first support member;
the step of attaching the coupler to the top connection portion of the second support member comprises inserting the second coupler extension into the axial hole of the top connection portion of the second support member.

17. The method of claim 14, further comprising the steps of:
placing a third building module having a third support member onto the first building module so that the third support member is in axial alignment with the first support member;
attaching the third first support member to the coupler using a third bolt that has been inserted into the third support member through the top connection portion of the third support member so that the third bolt shank extends through the axial bore of the bottom connection portion of the third support member and engages the first threaded aperture in the coupler.

* * * * *